US012566797B1

(12) United States Patent (10) Patent No.: US 12,566,797 B1
Nguyen et al. (45) Date of Patent: Mar. 3, 2026

(54) RETRIEVAL, ANNOTATION, AND SELECTION OF VIDEO SEGMENTS

(71) Applicant: Google LLC, Mountain View, CA (US)

(72) Inventors: Huy Thong Nguyen, Mountain View, CA (US); Benjamin John Louie, Newark, CA (US); Canwen Jiao, Menlo Park, CA (US); Chunglin Wen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/912,172

(22) Filed: Oct. 10, 2024

(51) Int. Cl.
| | |
|---|---|
| *G06F 17/00* | (2019.01) |
| *G06F 7/00* | (2006.01) |
| *G06F 16/2457* | (2019.01) |
| *G06F 16/735* | (2019.01) |
| *G06F 16/74* | (2019.01) |

(52) U.S. Cl.
CPC ...... *G06F 16/735* (2019.01); *G06F 16/24578* (2019.01); *G06F 16/743* (2019.01)

(58) Field of Classification Search
CPC . G06F 16/735; G06F 16/743; G06F 16/24578
USPC ........................................................ 707/728
See application file for complete search history.

(56) References Cited

U.S. PATENT DOCUMENTS

| | | | | |
|---|---|---|---|---|
| 2021/0150249 A1* | 5/2021 | Zheng | ................... | G06V 10/761 |
| 2024/0395042 A1* | 11/2024 | Boiarov | ............... | G06V 10/774 |
| 2025/0028758 A1* | 1/2025 | Yoon | .................... | G06V 10/776 |

* cited by examiner

*Primary Examiner* — Pavan Mamillapalli
(74) *Attorney, Agent, or Firm* — DORITY & MANNING P.A.

(57) ABSTRACT

Methods, systems, devices, and non-transitory computer readable media for video frame search and retrieval are provided. The disclosed technology can include receiving a search query. Based on inputting the search query into machine-learned models, a search query embedding can be generated. Based on comparing the search query embedding to video embeddings, video relevance scores can be determined. Relevant video embeddings comprising the video embeddings that are associated with the video relevance scores that satisfy relevance criteria can be determined. Based on comparing the search query embedding to the frame segment embeddings associated with the relevant video embeddings, frame segment relevance scores associated with the frame segment embeddings can be determined. Relevant frame segment embeddings comprising the frame segment embeddings associated with the frame segment relevance scores that satisfy the relevance criteria can be determined. Furthermore, search results associated with frames corresponding to the relevant frame segment embeddings can be generated.

20 Claims, 12 Drawing Sheets

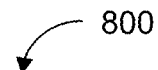

```
┌──────────────────────────────────────────┐
│         RECEIVE A SEARCH QUERY             │  802
└──────────────────────────────────────────┘
                    │
                    ▼
┌──────────────────────────────────────────┐
│        GENERATE A SEARCH EMBEDDING         │  804
└──────────────────────────────────────────┘
                    │
                    ▼
┌──────────────────────────────────────────┐
│    DETERMINE A PLURALITY OF RELEVANCE      │  806
│                  SCORES                    │
└──────────────────────────────────────────┘
                    │
                    ▼
┌──────────────────────────────────────────┐
│  DETERMINE A PLURALITY OF RELEVANT VIDEO   │  808
│                EMBEDDINGS                  │
└──────────────────────────────────────────┘
                    │
                    ▼
┌──────────────────────────────────────────┐
│   DETERMINE A PLURALITY OF FRAME SEGMENT   │  810
│             RELEVANCE SCORES               │
└──────────────────────────────────────────┘
                    │
                    ▼
┌──────────────────────────────────────────┐
│  DETERMINE A PLURALITY OF RELEVANT FRAME   │  812
│            SEGMENT EMBEDDINGS              │
└──────────────────────────────────────────┘
                    │
                    ▼
┌──────────────────────────────────────────┐
│     GENERATE ONE OR MORE SEARCH RESULTS    │  814
└──────────────────────────────────────────┘
                    │
                    ▼
┌──────────────────────────────────────────┐
│    SORT THE ONE OR MORE SEARCH RESULTS     │  816
└──────────────────────────────────────────┘
```

FIG. 8

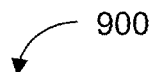
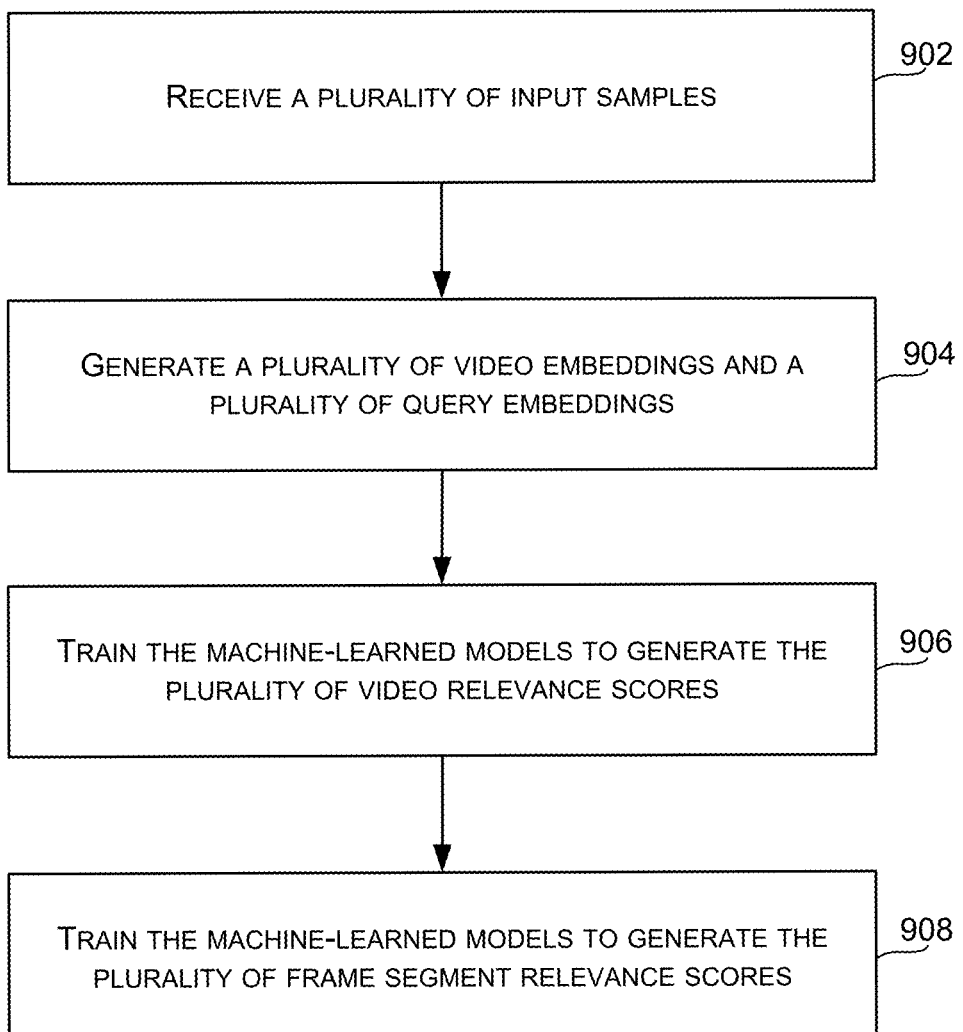
900
902 — RECEIVE A PLURALITY OF INPUT SAMPLES
904 — GENERATE A PLURALITY OF VIDEO EMBEDDINGS AND A PLURALITY OF QUERY EMBEDDINGS
906 — TRAIN THE MACHINE-LEARNED MODELS TO GENERATE THE PLURALITY OF VIDEO RELEVANCE SCORES
908 — TRAIN THE MACHINE-LEARNED MODELS TO GENERATE THE PLURALITY OF FRAME SEGMENT RELEVANCE SCORES
FIG. 9

RETRIEVAL, ANNOTATION, AND SELECTION OF VIDEO SEGMENTS

FIELD

The present disclosure relates generally to the retrieval of relevant frames from video samples. More particularly, the present disclosure relates to using machine-learned models to generate embeddings, process queries, and retrieve relevant frames that can be provided in search results.

BACKGROUND

Search and retrieval of different types of data can be performed in a variety of different ways. The effectiveness of a search algorithm can be associated with the relevance of the search results that are provided. In some instances, the relevance of search results can be suboptimal, which can be time consuming and potentially cause excessive use of computational resources. Further, some search results may include relevant results that can be difficult to find due to being buried in a larger quantity of less relevant results. Filtering irrelevant results can require an additional expenditure of time and computing resources. As a result, attempting to improve the effectiveness of search services and applications can present challenges. Accordingly, there may be different approaches to performing searches.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of video frame search and retrieval. The computer-implemented method can comprise receiving, by a computing system comprising one or more processors, a search query. The computer-implemented method can comprise generating, by the computing system, based on inputting the search query into a plurality of machine-learned models, a search query embedding. The computer-implemented method can comprise determining, by the computing system, based on comparing the search query embedding to a plurality of video embeddings, a plurality of video relevance scores associated with the plurality of video embeddings. The plurality of video embeddings can be based on a plurality of video samples comprising a plurality of frames. The plurality of video embeddings can be associated with a plurality of frame segment embeddings based on clusters of one or more similar frames of the plurality of frames. The computer-implemented method can comprise determining, by the computing system, a plurality of relevant video embeddings comprising the plurality of video embeddings associated with the plurality of video relevance scores that satisfy one or more relevance criteria. The computer-implemented method can comprise determining, by the computing system, based on comparing the search query embedding to the plurality of frame segment embeddings associated with the plurality of relevant video embeddings, a plurality of frame segment relevance scores associated with the plurality of frame segment embeddings. The computer-implemented method can comprise determining, by the computing system, a plurality of relevant frame segment embeddings comprising the plurality of frame segment embeddings associated with the plurality of frame segment relevance scores that satisfy the one or more relevance criteria. The computer-implemented method can comprise generating, by the computing system, one or more search results associated with one or more frames corresponding to the plurality of relevant frame segment embeddings.

Another example aspect of the present disclosure is directed to one or more tangible non-transitory computer-readable media storing computer-readable instructions that when executed by one or more processors cause the one or more processors to perform operations. The operations can comprise receiving a search query. The operations can comprise generating, based on inputting the search query into a plurality of machine-learned models, a search query embedding. The operations can comprise determining, based on comparing the search query embedding to a plurality of video embeddings, a plurality of video relevance scores associated with the plurality of video embeddings. The plurality of video embeddings can be based on a plurality of video samples comprising a plurality of frames. The plurality of video embeddings can be associated with a plurality of frame segment embeddings based on clusters of one or more similar frames of the plurality of frames. The operations can comprise determining a plurality of relevant video embeddings comprising the plurality of video embeddings associated with the plurality of video relevance scores that satisfy one or more relevance criteria. The operations can comprise determining, based on comparing the search query embedding to the plurality of frame segment embeddings associated with the plurality of relevant video embeddings, a plurality of frame segment relevance scores associated with the plurality of frame segment embeddings. The operations can comprise determining a plurality of relevant frame segment embeddings comprising the plurality of frame segment embeddings associated with the plurality of frame segment relevance scores that satisfy the one or more relevance criteria. The operations can comprise generating one or more search results associated with one or more frames corresponding to the plurality of relevant frame segment embeddings.

Another example aspect of the present disclosure is directed to a computing system comprising: one or more processors; one or more non-transitory computer-readable media storing instructions that when executed by the one or more processors cause the one or more processors to perform operations. The operations can comprise receiving a search query. The operations can comprise generating, based on inputting the search query into a plurality of machine-learned models, a search query embedding. The operations can comprise determining, based on comparing the search query embedding to a plurality of video embeddings, a plurality of video relevance scores associated with the plurality of video embeddings. The plurality of video embeddings can be based on a plurality of video samples comprising a plurality of frames. The plurality of video embeddings can be associated with a plurality of frame segment embeddings based on clusters of one or more similar frames of the plurality of frames. The operations can comprise determining a plurality of relevant video embeddings comprising the plurality of video embeddings associated with the plurality of video relevance scores that satisfy one or more relevance criteria. The operations can comprise determining, based on comparing the search query embedding to the plurality of frame segment embeddings associated with the plurality of relevant video embeddings, a plurality of frame segment relevance scores associated with the plurality of frame segment embeddings. The operations can comprise determining a plurality of relevant frame segment embeddings comprising the plurality of frame segment embeddings associated with the plurality of frame segment relevance scores that satisfy the one or more relevance criteria. The operations can comprise generating one or more search results associated with one or more frames corresponding to the plurality of relevant frame segment embeddings.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8 depicts a flow chart diagram of an example method of video frame search and retrieval according to example embodiments of the present disclosure;

FIG. 9 depicts a flow chart diagram of an example method of generating embeddings and training machine-learning models according to example embodiments of the present disclosure.

Figure 1A:
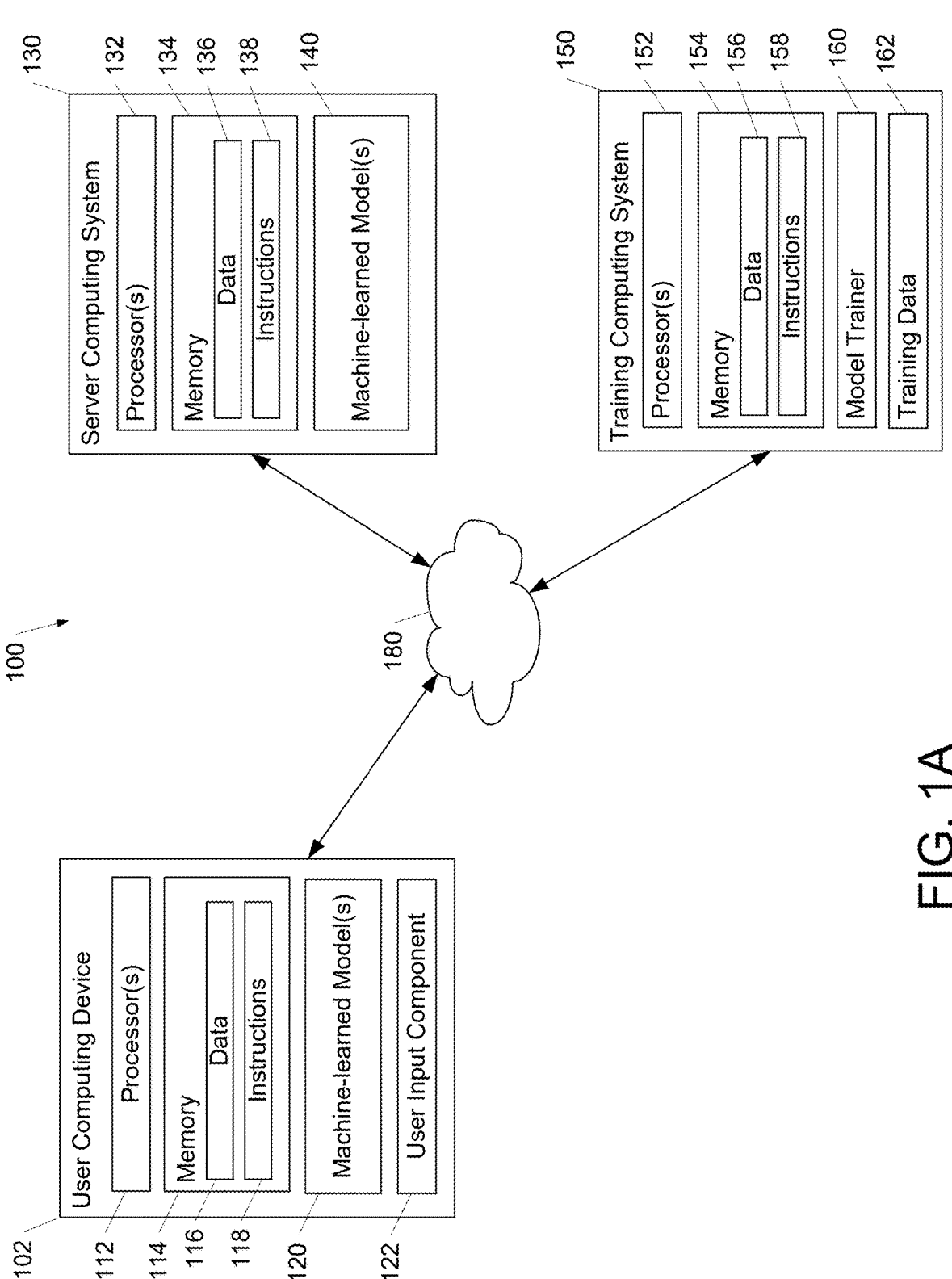
FIG. 1A depicts a block diagram of an example computing system that can generate embeddings, train machine-learning models, and retrieve relevant frames of video samples according to example embodiments of the present disclosure.

Reference numerals that are repeated across plural figures are intended to identify the same features in various implementations.

DETAILED DESCRIPTION

In general, the present disclosure is directed to generating embeddings (e.g., dense numerical representations of data associated with video, images, text, and/or audio) that can be used in a variety of search and retrieval tasks. Further, the disclosed technology can improve the performance and/or efficiency of operations to search and retrieve relevant frames from video samples. In particular, the disclosed technology can implement machine-learned models to generate embeddings based on video samples and frames of individual video samples. Searches can then be performed on the video samples and on clusters of frame segments from the video samples that were determined to be relevant. In addition to providing the relevant video samples as search results, the frame segments can be provided in thumbnails that more accurately indicate the content of a video sample.

For example, a computing system can receive a search query. For example, a search query associated with reviews of museums can be sent to the computing device via a search application (e.g., a search application front-end in a web browser implemented on the computing system). Based on inputting the search query into a plurality of machine-learned models, a search query embedding can be generated. The search embedding can comprise a lower dimensionality representation of the search query.

The computing system can then determine, based on comparing the search query embedding to a plurality of video embeddings, a plurality of video relevance scores associated with the plurality of video embeddings. The plurality of video relevance scores can indicate the relevance of the search query with respect to the plurality of video embeddings. For example, the video relevance score associated with a search query for "pet videos" can be high (e.g., 95 on a scale of 0 to 100 in which a higher numerical value is positively correlated with the relevance score) with respect to a video embedding based on a highly relevant video sample of house cats. In contrast, the video relevance score associated with a search query for "pet videos" can be low (e.g., 5 on a scale of 0 to 100 in which a higher numerical value is positively correlated with the relevance score) with respect to a video embedding based on an irrelevant video sample of bulldozers at a construction site with no pets.

The plurality of video embeddings can be based on a plurality of video samples comprising a plurality of frames. Further, the plurality of video embeddings can be associated with a plurality of frame segment embeddings based on clusters of one or more similar frames of the plurality of frames. The plurality of video embeddings and the plurality of frame segment embeddings can be generated by the same machine-learned models that were used to generate the search query embeddings.

The computing system can determine a plurality of relevant video embeddings that comprise the plurality of video embeddings associated with the plurality of video relevance scores that satisfy one or more relevance criteria. For example, the relevant video embeddings can comprise the plurality of video embeddings associated with relevance scores that exceed a relevance threshold. Based on comparing the search query embedding to the plurality of frame segment embeddings associated with the plurality of relevant video embeddings, a plurality of frame segment relevance scores associated with the plurality of frame segment embeddings can be determined. Further, a plurality of relevant frame segment embeddings comprising the plurality of frame segment embeddings associated with the plurality of frame segment relevance scores that satisfy the one or more relevance criteria can be determined. For example, the relevant frame segment embeddings can comprise the plurality of frame segment embeddings associated with relevance scores that exceed a relevance threshold.

Search results associated with one or more frames corresponding to the plurality of relevant frame segment embeddings can then be generated. For example, the search results for a search query associated with reviews of museums can comprise thumbnail images based on the one or more frames that correspond to the plurality of relevant frame segment embeddings. Further, the search results can comprise one or more frame segments from video samples of museum reviews in which a guide tours a museum.

The disclosed technology can be used to perform a variety of technical tasks including generating frame level embeddings, performing search and retrieval of frame segments, and automatically generating relevant thumbnails for search results. As such, the disclosed technology allows for the generation of embeddings including frame segment embeddings that may be used for more precise retrieval of frame segments that are relevant to search queries.

The disclosed technology can be implemented in a computing system (e.g., an embedding processing computing system) that is configured to access data and/or perform operations on the data. For example, the operations performed by the computing system can comprise receiving a search query, generating a search query embedding, determine a plurality of video relevance scores, determining a plurality of relevant video embeddings, determining a plurality of frame segment relevance scores, and/or determining a plurality of relevant frame segment embeddings.

The computing system can be included as part of a system that includes a server computing device that receives data comprising search queries from a client computing device, performs operations based on the data and sends output comprising search results back to the client computing device. In some embodiments, the computing system can include specialized hardware and/or software that enables the performance of operations specific to the disclosed technology. For example, the computing system can include one or more application specific integrated circuits and/or neural processing units that are configured to perform operations associated with the generation of video embeddings and/or frame segment embeddings that can be used to assist a user in the tasks of search and data retrieval.

The computing system can receive a search query. For example, the computing system can receive a search query that is associated with content and/or information that can be provided in search results. For example, a search query associated with a search for reviews of amusement parks can indicate "TOP AMUSEMENT PARKS IN ORLANDO"). The search query can comprise a text-based search query (e.g., a query comprising text that is provided via an input device which can include a keyboard). In some embodiments, a search query can comprise a speech-based query (e.g., a query comprising speech that is provided via an audio input device which can include a microphone).

The computing system can generate a search query embedding based on the search query. The search query embedding can be generated, based on inputting the search query into a plurality of machine-learned models that can be configured and/or trained to generate the search query based on input comprising the search query. The search query embedding can be generated based on processing features of the search query and generating an embedding that comprises a feature space (a plurality of feature vectors) that can represent features of the search query and which has a lower dimensionality than the search query on which the search query embedding is based. The search query embedding can be compared to a plurality of video embeddings, a plurality of frame embeddings, and/or a plurality of frame segment embeddings to determine the associated video samples and/or frame segments that are relevant to the search query associated with the search query embedding.

The computing system can determine a plurality of video relevance scores associated with a plurality of video embeddings. The plurality of video embeddings can be based on a plurality of video samples comprising a plurality of frames. The plurality of video embeddings and/or the plurality of frame segment embeddings can be generated, based on inputting a plurality of video samples into a plurality of machine-learned models that can be configured and/or trained to generate the plurality of video embeddings and/or the plurality of frame segment embeddings based on input comprising the plurality of video samples. The plurality of video embeddings and/or the plurality of frame segment embeddings can be generated based on processing features of the plurality of video samples (e.g., visual features, spatial features, motion features, and/or temporal features) and generating an embedding that comprises a feature space (a plurality of feature vectors) that can represent features of the plurality of video samples and have a lower dimensionality than the plurality of video samples on which the plurality of video embeddings and/or the plurality of frame segment embeddings are based.

The plurality of video embeddings can comprise and/or be associated with a plurality of frame segment embeddings based on clusters of one or more similar frames of the plurality of frames. The plurality of frame segment embeddings can be based on processing the plurality of frames to determine adjacent frames (e.g., frames that immediately follow or precede another frame). The computing system can determine a similarity of frames (e.g., adjacent frames) based on analyzing visual features of the frames and determining that frames with greater that satisfy one or more similarity criteria (e.g., a similarity of the frames exceeding a threshold similarity) can be clustered. A cluster of the plurality of frames can comprise one or more frames. For example, a cluster of the plurality of frames can comprise a one frame, two frames, three frames, ten frames, thirty frames, one hundred frames, or various other numbers of frames. Further, the plurality of frame segment embeddings can be based on the clusters of frames.

In some embodiments, the plurality of video embeddings, the plurality of frame segment embeddings, and/or the plurality of query embeddings can be stored in a lookup table. Further, the lookup table can be included in a search index that is used to access, search, retrieve, send, and/or compare the search query embedding to the plurality of video embeddings, the plurality of frame segment embeddings, the plurality of video samples, the plurality of frames, and/or the plurality of frame segments.

The plurality of video relevance scores can be determined and/or generated based on comparing the search query embedding to a plurality of video embeddings. The plurality of video relevance scores can be associated with a relevance of the plurality of video embeddings with respect to the search query embedding. Further, the plurality of frame segment relevance scores can be associated with a relevance of the plurality of frame segment embeddings with respect to the search query embedding. For example, the video relevance score associated with a search query for "race cars" can be high (e.g., 98 on a scale of 0 to 100 in which a higher numerical value is positively correlated with the video relevance score) with respect to a video embedding based on a highly relevant video sample of race cars driving on a racetrack. In contrast, the video relevance score associated with a search query for "race cars" can be low (e.g., 4 on a scale of 0 to 100 in which a higher numerical value is positively correlated with the video relevance score) with respect to a video embedding based on an irrelevant video sample of a cat sleeping indoors with no race cars or vehicles present.

In some embodiments, the plurality of video relevance scores can be based on a cosine similarity between the search query embedding and the plurality of video embeddings. The plurality of video relevance scores can be positively correlated with the cosine similarity. For example, a search query and a video embedding that have a high cosine similarity can have a high relevance score. Further, a search query and a video embedding that have a low cosine similarity can have a low relevance score.

In some embodiments, the plurality of video relevance scores can be based on a Euclidean distance between the search query embedding and the plurality of video embeddings. The plurality of video relevance scores can be inversely correlated with the Euclidean distance. For example, a search query and a video embedding that are separated by a short Euclidean distance can have a high relevance score. Further, a search query and a video embedding that are separated by a long Euclidean distance can have a low relevance score.

The computing system can determine a plurality of relevant video embeddings comprising the plurality of video embeddings that are associated with the plurality of video relevance scores that satisfy one or more relevance criteria. The one or more relevance criteria can comprise one or more video relevance criteria and/or one or more frame relevance criteria. The one or more video relevance criteria can be associated with a relevance of the plurality of video embeddings. The one or more frame relevance criteria can be associated with a relevance of the plurality of frame segment embeddings. Satisfying the one or more relevance criteria can comprise the plurality of video relevance scores or the plurality of frame segment relevance scores exceeding a relevance threshold. For example, the computing system can determine that the one or more relevance criteria have been satisfied when a video relevance score that can range from 0.0 to 1.0 exceeds 0.95.

The computing system can determine a plurality of frame segment relevance scores. The plurality of frame segment relevance scores can be associated with the plurality of frame segment embeddings. Determining the plurality of frame segment relevance scores can be based on comparing the search query embedding to the plurality of frame segment embeddings. For example, the computing system can compare the search embedding to each of the plurality of frame segment embeddings. In some embodiments, determining the plurality of frame segment relevance scores can be based on comparing the search query embedding to the plurality of frame segment embeddings associated with the plurality of relevant video embeddings. For example, the computing system can compare the search embedding to each of the plurality of frame segment embeddings that is associated with the plurality of relevant video embeddings that satisfy one or more relevance criteria.

The plurality of frame segment relevance scores can be based on and/or associated with a relevance of the search query with respect to a frame segment embedding of the plurality of frame segment embeddings. For example, the frame segment relevance score associated with a search query for "pianist" can be high (e.g., 98 on a scale of 0 to 100 in which a higher numerical value is positively correlated with the frame segment relevance score) with respect to a frame segment embedding based on a highly relevant frame segment of a pianist performing a piano sonata in front of an audience. In contrast, the frame segment relevance score associated with a search query for "pianist" can be low (e.g., 4 on a scale of 0 to 100 in which a higher numerical value is positively correlated with the frame segment relevance score) with respect to a frame segment embedding based on an irrelevant frame segment of a bowl of oatmeal with no pianist or piano present.

The plurality of frame segment relevance scores can be based on a cosine similarity between the search query embedding and the plurality of frame segment embeddings. For example, a search query and a frame segment embedding that have a high cosine similarity can have a high relevance score. Further, a search query and a frame segment embedding that have a low cosine similarity can have a low relevance score.

In some embodiments, the plurality of frame segment relevance scores can be based on a Euclidean distance between the search query embedding and the plurality of frame segment embeddings. The plurality of frame segment relevance scores can be inversely correlated with the Euclidean distance. For example, a search query and a frame segment embedding that are separated by a short Euclidean distance can have a high relevance score. Further, a search query and a frame segment embedding that are separated by a long Euclidean distance can have a low relevance score.

The computing system can determine a plurality of relevant frame segment embeddings. The plurality of relevant frame segment embeddings can comprise the plurality of frame segment embeddings associated with the plurality of frame segment relevance scores that satisfy the one or more relevance criteria. The one or more relevance criteria can comprise a relevance threshold. The plurality of frame segment embeddings that satisfy the one or more relevance criteria can comprise the plurality of frame segment embeddings associated with a relevance score that is equal to or exceeds the relevance threshold. For example, the computing system can determine that the one or more relevance criteria have been satisfied when a frame segment relevance score that can range from 0.0 to 1.0 exceeds 0.90.

The computing system can generate one or more search results associated with one or more frames corresponding to the plurality of relevant frame segment embeddings. For example, a computing device on which a web browser application is operating can return one or more search results provided by a search engine. The one or more search results in response to a query about cetaceans can comprise video samples and/or images of various types of dolphins and whales swimming in different marine environments.

The one or more search results can be determined based on determining the frames that correspond to the plurality of relevant frame segment embeddings. In some embodiments, the one or more frames corresponding to the plurality of relevant frame segment embeddings can be determined based on use of a lookup table, an embeddings database, and/or a search index. The lookup table, an embeddings database, and/or a search index can comprise information associated with the plurality of video embeddings, the plurality of frame segment embeddings, the plurality of video samples, and/or the plurality of frames of the plurality of video samples.

The one or more search results can comprise one or more thumbnail images based on the one or more frames corresponding to the plurality of relevant frame segment embeddings. For example, a web browser implemented on a computing device can display images including thumbnail images that can include a still image based on the one or more frames and/or a video sample based on the one or more frames.

The one or more search results can comprise one or more indications associated with a plurality of time intervals of the one or more frames corresponding to the plurality of relevant frame segment embeddings. For example, the one or more search results can comprise the one or more frames and annotations (e.g., text) below the one or more frames that indicates a time interval (e.g., a time interval in minutes and seconds) within a corresponding video sample that includes the one or more frames.

The computing system can sort one or more search results. Sorting the one or more search results can be based on the plurality of frame segment relevance scores associated with the plurality of frame segment embeddings that satisfy the one or more relevance criteria. For example, the one or more search results can be sorted from the most relevant to the least relevant. In some embodiments, the most relevant search results can be highlighted or presented in a larger size in comparison to less relevant results.

The computing system can receive, access, and/or retrieve a plurality of input samples. The plurality of input samples can comprise the plurality of video samples, a plurality of image samples, and/or a plurality of topics. The plurality of topics can be associated with the plurality of video samples and/or the plurality of images. The plurality of topics can classify, identify, and/or describe the contents of the plurality of video samples. For example, a video sample of a judge in court can be associated with topics and/or queries comprising laws, courts, judges, lawyers, and/or legal proceedings. The plurality of video samples can comprise the plurality of frames and can be associated with a plurality of labels (e.g., labels that describe the contents of the frames and/or a position of a frame relative to other frames within a video sample).

Further, the plurality of input samples can comprise a plurality of video samples. The plurality of video samples can comprise video segments that can be of varying lengths, bitrates, and/or encoding formats (e.g., different video codecs). In some embodiments, the plurality of video samples can comprise and/or be associated with metadata that can indicate information associated with the plurality of video samples. Further, the metadata associated with the plurality of video samples can comprise queries and/or topics associated with the plurality of video samples and/or a time at which the plurality of video samples were generated or modified. For example, the metadata associated with a video sample of a dog chasing a cyclist can indicate that the video sample is associated with dogs and/or cyclists.

In some embodiments, the plurality of input samples can comprise a plurality of images. For example, the plurality of images can comprise images of various resolutions, image encoding formats, and/or colors spaces. For example, the plurality of images can comprise color images, black and white images, and/or grayscale images. Further, the plurality of input samples can comprise a plurality of text segments (e.g., individual letters, words, sentences, and/or paragraphs of text) and/or a plurality of audio segments (e.g., audio segments of various bitrates and/or audio encoding formats. In some embodiments, the plurality of input samples can be formatted to facilitate the training of a machine-learning model. For example, the plurality of input samples comprising video samples can be formatted to have the same or similar bitrates.

In some embodiments, the plurality of input samples can be generated (e.g., automatically generated) by a plurality of machine-learned sample generation models. The plurality of machine-learned input sample generation models can automatically generate a plurality of labels that are associated with a plurality of input samples. For example, the plurality of sample generation models can comprise a machine-learned diffusion model that can be configured and/or trained to generate video samples and/or images. Further, the plurality of machine-learned sample generation models can be configured to generate a plurality of confidence scores associated with the plurality of input samples. The plurality of confidence scores can indicate the probability that a label associated with an input sample is accurate. Further, the plurality of machine-learned sample generation models can be configured and/or trained to generate a plurality of input samples comprising a plurality of queries and/or topics associated with a plurality of input samples (e.g., queries associated with video samples and/or images).

The computing system can generate a plurality of embeddings. The plurality of embeddings can comprise a plurality of video embeddings, a plurality of frame embeddings, a plurality of frame segment embeddings, a plurality of image embeddings, and/or a plurality of query embeddings. Generating the plurality of embeddings can be based on inputting the plurality of input samples into the plurality of machine-learned models. The plurality of machine-learned models can be configured and/or trained to generate the plurality of video embeddings based on the plurality of input samples (e.g., video samples). The plurality of machine-learned models can be configured and/or trained to generate the plurality of frame segment embeddings based on the plurality of input samples (e.g., video samples) and/or the plurality of embeddings (e.g., the plurality of video embeddings and/or the plurality of image embeddings). The plurality of video embeddings can be based on the plurality of video samples and can comprise a plurality of frame segment embeddings based on the plurality of frames. The plurality of query embeddings can be based on the plurality of topics and/or queries. The plurality of image embeddings can be based on the plurality of images.

The plurality of embeddings (e.g., the plurality of video embeddings, the plurality of frame segment embeddings, and/or the plurality of query embeddings) can comprise a plurality of representations (e.g., numerical representations) of the plurality of input samples. Further, the plurality of embeddings can comprise a plurality of vectors that have a lower dimensionality than the plurality of input samples on which the plurality of embeddings are based. For example, a video embedding can have 1024 dimensions and the video sample on which the video embedding is based can have millions of dimensions corresponding to the frames and/or pixels of the video sample. The plurality of machine-learned models can configured and/or trained to generate the plurality of embeddings (e.g., the plurality of video embeddings, the plurality of frame segment embeddings, and/or the plurality of query embeddings) such that the vectors of the embeddings are arranged in a vector space in which the distance (e.g., Euclidean distance or cosine distance) between vectors in the vector space is positively correlated with the similarity of the vectors. For example, in the plurality of video embeddings the distance between a vector associated with a video sample of a person rowing and a person canoeing can be shorter than the distance between the vector associated with a video sample of a helicopter in flight and a vector associated with a video sample of a cup of tea.

In some embodiments, the plurality of machine-learned models can comprise one or more transformer models. The one or more transformer models can be configured and/or trained to generate the plurality of video embeddings based on the plurality of input samples. Further, the one or more transformer models can be configured and/or trained to generate the plurality of frame segment embeddings based on the plurality of input samples (e.g., video samples, video embeddings, and/or images). In some embodiments, the plurality of machine-learned models can comprise one or more large language models (LLMs). The one or more LLMs can be configured and/or trained to generate the plurality of query embeddings based on input comprising the plurality of input samples (e.g., query samples comprising queries and/or topics).

The computing system can train, based on the plurality of video embeddings and/or the plurality of query embeddings, the plurality of machine-learned models to generate the plurality of video relevance scores associated with a relevance of the plurality of query embeddings with respect to the plurality of video embeddings. Training the plurality of machine-learned models can comprise modifying a plurality of parameters of the plurality of machine-learned models to minimize a loss associated with a relevance of the plurality of query embeddings with respect to the plurality of video embeddings.

The computing system can train, based on the plurality of frame segment embeddings and/or the plurality of query embeddings, the plurality of machine-learned models to generate the plurality of frame segment relevance scores associated with a relevance of the plurality of topics and/or queries with respect to the plurality of frame segment embeddings. Training the plurality of machine-learned models can comprise modifying a plurality of parameters of the plurality of machine-learned models to minimize a loss associated with a relevance of the plurality of topics and/or queries with respect to the plurality of frame segment embeddings.

The plurality of machine-learned models can be configured and/or trained to generate one or more clusters of the plurality of frames based on a similarity between two or more frames of the plurality of frames. For example, the plurality of machine-learned models can be configured and/or or trained to recognize adjacent frames that are substantially similar. In some embodiments, the plurality of machine-learned models can comprise a video encoder that is configured and/or trained to generate the plurality of video embeddings and/or the plurality of frame segment embeddings based on detecting, recognizing, or classifying features (e.g., visual features, spatial features, temporal features, and/or motion features) of the plurality of input samples.

After each of the plurality of iterations, a loss associated with the accuracy of the output generated by the plurality of machine-learned models can be generated (e.g., a loss that is inversely correlated with the accuracy of the output of the plurality of machine-learned models). The weights of the parameters that contribute to decreasing the loss can be increased and the weights of the parameters that do not contribute to decreasing the loss or that increase the loss can be decreased. The plurality of machine-learned models can be trained until some threshold accuracy level (e.g., 0.96 on a scale of 0.0 to 1.0 in which 1.0 is the highest accuracy and 0.0 is the lowest accuracy) is achieved.

In some embodiments, training the plurality of machine-learned models can comprise receiving training data comprising the plurality of query embeddings, the plurality of video embeddings, and a corresponding plurality of ground-truth video relevance scores associated with the relevance of the plurality of query embeddings with respect to the plurality of video embeddings. Further, training the plurality of machine-learned models can comprise determining, based on inputting the training data comprising the plurality of query embeddings and the plurality of video embeddings into the plurality of machine-learned models, a plurality of predicted video relevance scores. Further, training the plurality of machine-learned models can comprise determining a loss based on one or more differences between the plurality of predicted video relevance scores and the corresponding plurality of ground-truth video relevance scores. Further, training the plurality of machine-learned models can comprise modifying a plurality of parameters of the plurality of machine-learned models to minimize the loss. Further, the loss can increase in proportion to the magnitude of differences between the plurality of predicted video relevance scores and the corresponding plurality of ground-truth video relevance scores. For example, a predicted video relevance score that is slightly different from a corresponding ground-truth video relevance score can result in a smaller loss than a predicted video relevance score that is significantly different from a ground-truth video relevance score.

In some embodiments, training the plurality of machine-learned models can comprise receiving training data comprising the plurality of query embeddings, the plurality of frame segment embeddings, and corresponding plurality of ground-truth frame segment relevance scores associated with the relevance of the plurality of query embeddings with respect to the plurality of frame segment embeddings. Further, training the plurality of machine-learned models can comprise determining, based on inputting the training data comprising the plurality of query embeddings and the plurality of frame segment embeddings into the plurality of machine-learned models, a plurality of predicted frame segment relevance scores. Further, training the plurality of machine-learned models can comprise determining a loss based on one or more differences between the plurality of predicted frame segment relevance scores and the corresponding plurality of ground-truth frame segment relevance scores. Further, training the plurality of machine-learned models can comprise modifying a plurality of parameters of the plurality of machine-learned models to minimize the loss. Further, the loss can increase in proportion to the magnitude of differences between the plurality of predicted frame segment relevance scores and the corresponding plurality of ground-truth frame segment relevance scores. For example, a predicted frame segment relevance score that is slightly different from a corresponding ground-truth video relevance score can result in a smaller loss than a predicted frame segment relevance score that is significantly different from a ground-truth frame segment relevance score.

In some embodiments, the plurality of video embeddings and/or the plurality of frame segment embeddings can be normalized. The computing system can generate, based on the plurality of video embeddings, a plurality of normalized video embeddings. Further, the computing system can generate, based on the plurality of frame segment embeddings, a plurality of normalized video embeddings. Generating the plurality of normalized video embeddings and/or the plurality of frame segment embeddings can comprise modifying the dimensionality of the vectors of the plurality of embeddings (e.g., the plurality of video embeddings and/or the plurality of frame segment embeddings) to be the same size (e.g., equal sized). For example, if the plurality of video embeddings have dimensionalities ranging from 128 dimensions to 1024 dimensions, the computing system can normalize the dimensionality of the plurality of video embeddings to 1024 dimensions.

In some embodiments, determining the plurality of relevant video embeddings and/or the plurality of relevant frame segment embeddings can be based on and/or comprise searching a search index. The search index can be generated based on the performance of operations to optimize an arrangement of the plurality of video embeddings and/or the plurality of frame segment embeddings to facilitate search and retrieval operations. Further, the search index can comprise the plurality of video embeddings and/or the plurality of frame segment embeddings. The search index can be configured to generate output comprising the plurality of relevant video embeddings and/or the plurality of relevant frame segment embeddings.

In some embodiments, the search index can be searched based on the use of a search algorithm that can be used to search the plurality of video embeddings and/or the plurality of frame segment embeddings. For example, the search algorithm can comprise a nearest neighbor algorithm (e.g., k-nearest neighbor algorithm or a scalable nearest neighbor algorithm) and/or a hashing algorithm (e.g., locality-sensitive hashing).

The systems, methods, devices, apparatuses, and tangible non-transitory computer-readable media in the disclosed technology can provide a variety of technical effects and benefits including improving the efficiency of resource utilization and improving the performance of computing systems. In particular, the disclosed technology can improve the efficiency of resource utilization by performing a two-step process in which relevance scores based on comparing a search query embedding to video embeddings are used to determine relevant video embeddings in the first step. In the second step, the search query is compared to frame segment embeddings to determine the relevant frames from the video that can be provided in search results. Preprocessing the relevant frames of video samples in advance can significantly improve the speed with which search results are retrieved. Further, using the more accurate frame segment results provided by the disclosed technology, relevant frames of a video can be provided as part of search results, thereby facilitating the search process, and reducing the time needed to find relevance search results.

Additionally, in the disclosed technology machine-learned models can be used to determine similar adjacent frames of a video sample. The adjacent frames can then be clustered into frame segments that can be processed to determine relevance with respect to the search query. Clustering similar frames of the video together can reduce the search space, which can result in improved search and retrieval performance. Reducing the time used for search and/or retrieval can result in a reduction in energy consumption by the computing devices that perform the search and/or retrieval.

Further, the disclosed technology can improve the performance of computing systems by generating frame segment embeddings that can be used to provide more accurate search results, thereby reducing the need to perform additional searches. The frame segment embeddings can reduce the number of redundant searches, which can reduce excessive use of computational resources when performing search and retrieval related tasks.

As such, the disclosed technology may assist the user of a computing device that implements a machine-learning system in more effectively performing a variety of tasks directed to search and retrieval of frame segments with the specific benefits of improved efficiency of resource utilization and improved computational performance. Further, any of the specific benefits provided to users can be used to improve the effectiveness of a wide variety of devices and services including computing devices and/or machine-learning applications. Accordingly, the improvements offered by the disclosed technology can result in tangible benefits to a variety of devices and/or systems including mechanical, electronic, and computing systems that can leverage the benefits of embeddings comprising frame segment embeddings that can be used to provide more accurate search results.

With reference now to the figures, example embodiments of the present disclosure will be discussed in further detail. FIG. 1A depicts a block diagram of an example computing system that can generate embeddings, train machine-learning models, and retrieve relevant frames of video samples according to example embodiments of the present disclosure. System 100 includes a computing device 102, a server computing system 130, and a training computing system 150 that are communicatively coupled over a network 180.

The computing device 102 can comprise any type of computing device, including, for example, a personal computing device (e.g., laptop computing device or desktop computing device), a mobile computing device (e.g., smartphone or tablet), a gaming console or controller, an embedded computing device, a wearable computing device (e.g., a smartwatch), or any other type of computing device.

The computing device 102 includes one or more processors 112 and a memory 114. The one or more processors 112 can comprise any suitable processing device (e.g., a processor core, a microprocessor, an ASIC, an FPGA, a controller, and/or a microcontroller) and can comprise one processor or a plurality of processors that are operatively connected. The memory 114 can include one or more non-transitory computer-readable storage media, such as RAM, ROM, EEPROM, EPROM, flash memory devices, magnetic disks, and/or combinations thereof. The memory 114 can store data 116 and instructions 118 which are executed by the processor 112 to cause the computing device 102 to perform operations.

In some implementations, the computing device 102 can store or include one or more machine-learned models 120. For example, the one or more machine-learned models 120 can be or can otherwise include various machine-learned models such as neural networks (e.g., deep neural networks) or other types of machine-learned models, comprising non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Examples of one or more machine-learned models 120 are discussed with reference to FIGS. 1-10.

In some implementations, the one or more machine-learned models 120 can be received from the server computing system 130 over network 180, stored in the memory 114, and then used or otherwise implemented by the one or more processors 112. In some implementations, the computing device 102 can implement multiple parallel instances of a single machine-learned model of the one or more machine-learned models 120 (e.g., to perform parallel video embedding generation operations and/or frame segment embedding operations across multiple instances of the one or more machine-learned models 120).

More particularly, the one or more machine-learned models 120 can comprise one or more machine-learned models (e.g., one or more transformer models) that are configured and/or trained to perform operations comprising receiving a search query, generating a search query embedding, determine a plurality of video relevance scores, determining a plurality of relevant video embeddings, determining a plurality of frame segment relevance scores, and/or determining a plurality of relevant frame segment embeddings.

Additionally or alternatively, one or more machine-learned models 140 (e.g., one or more transformer models) can be included in or otherwise stored and implemented by the server computing system 130 that communicates with the computing device 102 according to a client-server relationship. For example, the one or more machine-learned models 140 can be implemented by the server computing system 130 as a portion of a web service (e.g., a video embeddings generation service, a frame segment embedding generation service, a search service that uses video embeddings and/or frame segment embeddings, and/or a machine-learned model training service). Thus, one or more machine-learned models 120 can be stored and implemented at the computing device 102 and/or one or more machine-learned models 140 can be stored and implemented at the server computing system 130.

The computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other components by which a user can provide user input.

The server computing system 130 includes one or more processors 132 and a memory 134. The one or more processors 132 can be any suitable processing device (e.g., a processor core, a microprocessor, an ASIC, an FPGA, a controller, and/or a microcontroller) and can be one processor or a plurality of processors that are operatively connected. The memory 134 can include one or more non-transitory computer-readable storage media, such as RAM, ROM, EEPROM, EPROM, flash memory devices, magnetic disks, and/or combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the one or more machine-learned models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Examples of one or more machine-learned models 140 are discussed with reference to FIGS. 1-10.

The computing device 102 and/or the server computing system 130 can train the one or more machine-learned models 120 and/or the one or more machine-learned models 140 via interaction with the training computing system 150 that can be communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, and/or a microcontroller) and can be one processor or a plurality of processors that are operatively connected. The memory 154 can include one or more non-transitory computer-readable storage media, such as RAM, ROM, EEPROM, EPROM, flash memory devices, magnetic disks, and/or combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the one or more machine-learned models 120 and/or the one or more machine-learned models 140 stored at the computing device 102 and/or the server computing system 130 using various training or learning techniques (e.g., machine-learning techniques), such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a plurality of training iterations.

In some implementations, performing backwards propagation of errors can include performing truncated backpropagation through time. The model trainer 160 can perform a number of generalization techniques (e.g., weight decays, dropouts, and/or other generalization techniques.) to improve the generalization capability of the models being trained.

In particular, the model trainer 160 can train the one or more machine-learned models 120 and/or the one or more machine-learned models 140 based on a set of training data 162. The training data 162 can include various types of data. For example, the training data 162 can include a plurality of input samples (e.g., video samples, images, text segments, and/or audio segments) that can be associated with a plurality of labels. For example, the training data 162 can comprise a plurality of images of vehicles and the associated labels (e.g., the type of vehicle such as "helicopter" for an image of a helicopter). The training data 162 can also comprise ground-truth labels associated with the plurality of input samples in the training data 162. Further, the training data 162 can include various publications (e.g., books, articles, and/or journals) that can be received from a variety of sources including libraries, the Internet (e.g., websites), and/or devices that can comprise sensors and can be configured to generate and/or receive data (e.g., smartphones, smartwatches, and/or other computing devices that can be configured to receive sensor data and/or data entered by a user). The model trainer 160 can train and/or retrain the one or more machine-learned models 120 and/or the one or more machine-learned models 140 based on additional data from the training data 162 which can comprise additional input samples (e.g., updated input samples), new types of input samples (e.g., new types of input sample data based on sensor data from new sensor types), and/or one or more modifications to existing input samples.

In some implementations, if a user has provided consent (e.g., the user provides affirmative consent for another party to use the user's data), the training examples can be provided by the computing device 102. Thus, in such implementations, the one or more machine-learned models 120 provided to the computing device 102 can be trained by the training computing system 150 on user-specific data received from the computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM, hard disk, or optical or magnetic media.

The network 180 can comprise any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases. In some implementations, the input to the machine-learned model(s) of the present disclosure can be text or natural language data. The machine-learned model(s) can process the text or natural language data to generate an output (e.g., based on inputting queries from a user the machine-learned model(s) can process and generate an analysis comprising one or more explanations and visualizations associated with the queries and image data of the user). As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language). As another example, the machine-learned model(s) can process the text or natural language data to generate a prediction output.

In some implementations, the input to the machine-learned model(s) of the present disclosure can comprise speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data). As another example, the machine-learned model(s) can process the speech data to generate an upscaled speech output (e.g., speech data that is higher quality than the input speech data). As another example, the machine-learned model(s) can process the speech data to generate a textual representation output (e.g., a textual representation of the input speech data). As another example, the machine-learned model(s) can process the speech data to generate a prediction output.

In some implementations, the input to the machine-learned model(s) of the present disclosure can comprise latent encoding data (e.g., a latent space representation of an input). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can comprise statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can comprise sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images, one or more video samples, and/or one or more frames of video samples), the output comprises compressed visual data, and the task is a visual data compression task. In another example, the task may comprise generating an embedding for input data (e.g., input visual data and/or audio data).

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the computing device 102 can include the model trainer 160 and the training data 162. In such implementations, the one or more machine-learned models 120 can be both trained and used locally at the computing device 102. In some of such implementations, the computing device 102 can implement the model trainer 160 to personalize the one or more machine-learned models 120 based on user-specific data.

Figure 1B:
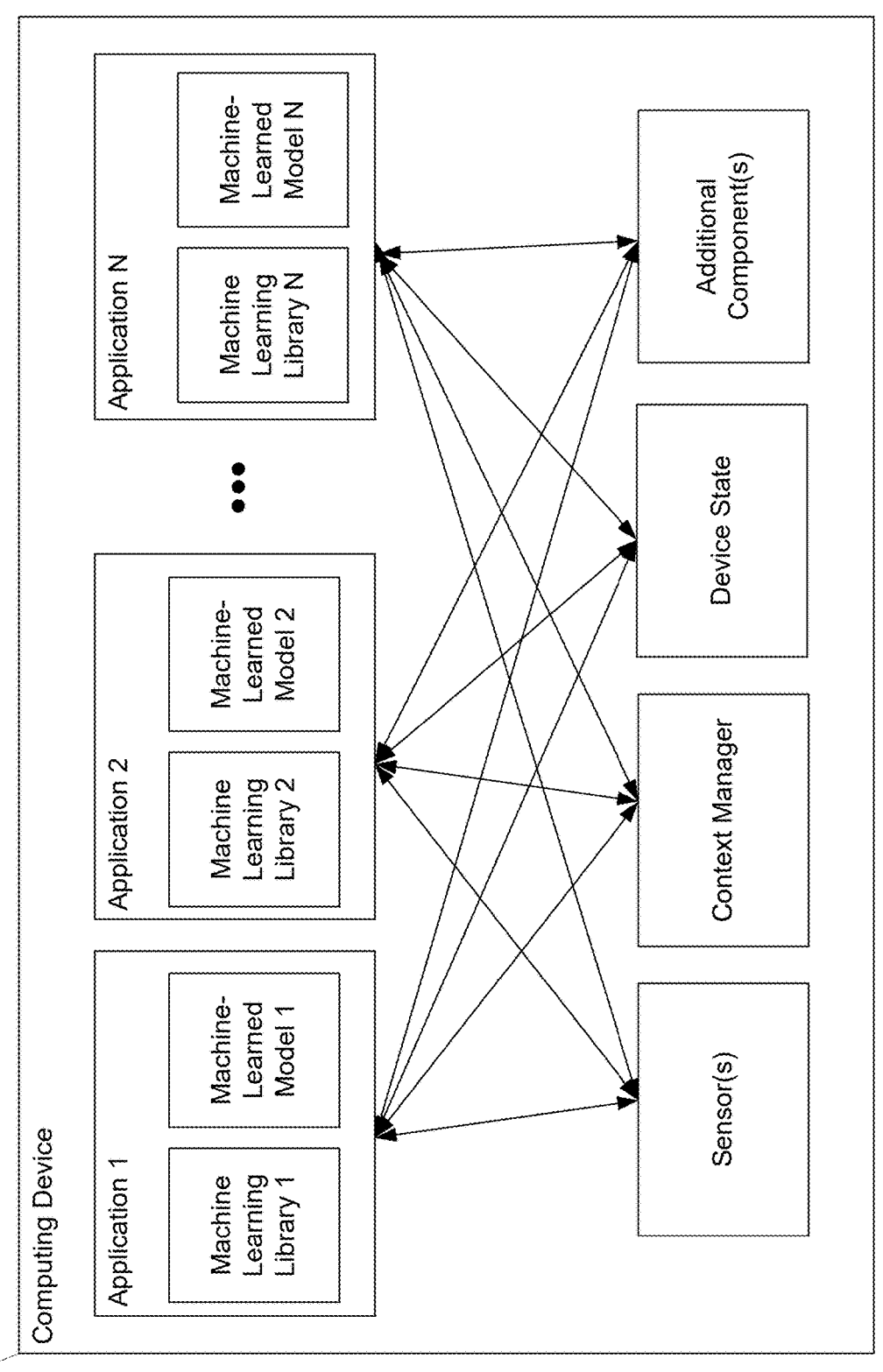
FIG. 1B depicts a block diagram of an example computing device that can generate embeddings, train machine-learning models, and retrieve relevant frames of video samples according to example embodiments of the present disclosure.

FIG. 1B depicts a block diagram of an example computing device that can generate embeddings, train machine-learning models, and retrieve relevant frames of video samples according to example embodiments of the present disclosure. A computing device 10 can be a user computing device or a server computing device.

The computing device 10 can include a number of applications (e.g., applications 1 through N). Each application contains its own machine-learned library and machine-learned model(s). For example, each application can include a machine-learned model. Example applications include an input sample processing application, a video embedding generation application, a frame segment embedding generation application, a machine-learned model training application, a messaging application, a dictation application, and/or a browser application.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
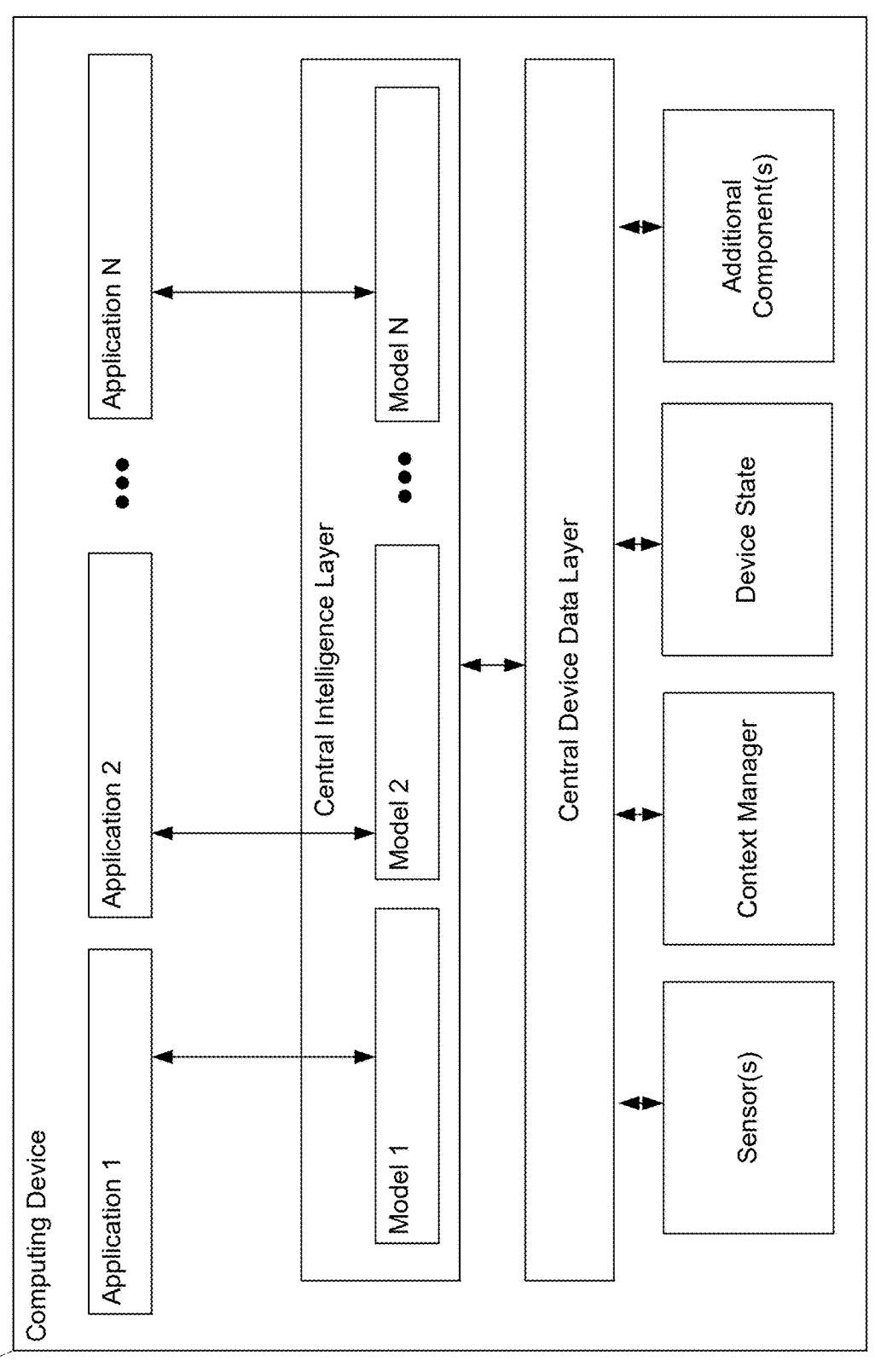
FIG. 1C depicts a block diagram of an example computing device that can generate embeddings, train machine-learning models, and retrieve relevant frames of video samples according to example embodiments of the present disclosure.

FIG. 1C depicts a block diagram of an example computing device that can generate embeddings, train machine-learning models, and/or retrieve relevant frames of video samples according to example embodiments of the present disclosure. A computing device 50 can be a user computing device or a server computing device.

The computing device 50 can include a number of applications (e.g., applications 1 through N). Each application is in communication with a central intelligence layer. Example applications include an input processing application (e.g., an application that is configured to process input samples and generate embeddings including video embeddings and/or frame segment embeddings), a search application (e.g., an application that is configured to search video embeddings and/or frame segment embeddings based on a search query), a machine-learned model training application (e.g., an application that is used to train machine-learned models based on input samples and/or embeddings), a messaging application, and/or a browser application. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
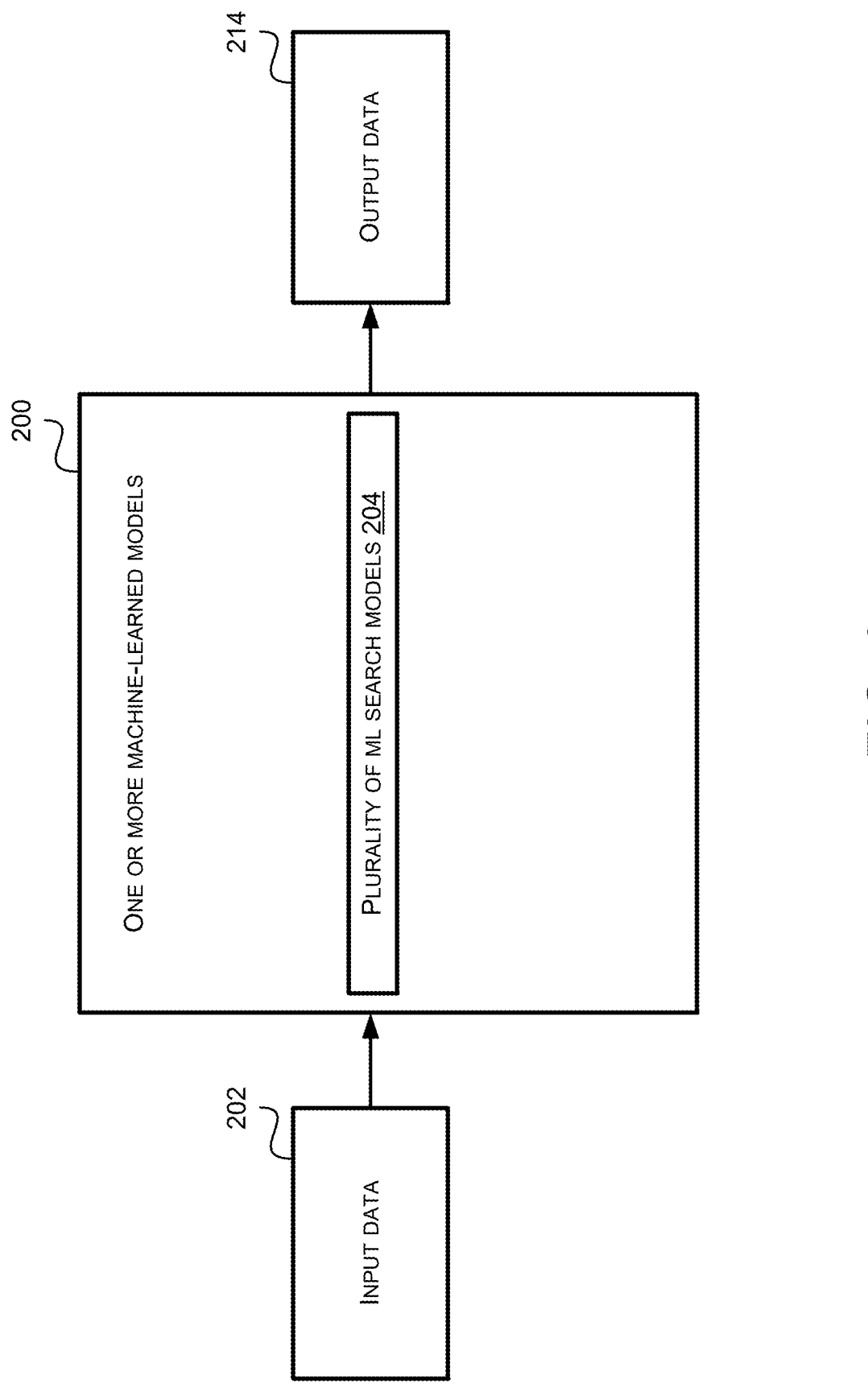
FIG. 2 depicts a block diagram of examples of machine-learned models according to example embodiments of the present disclosure.

FIG. 2 depicts a block diagram of examples of machine-learned models according to example embodiments of the present disclosure. In some implementations, the one or more machine-learned models 200 can be trained to receive input data 202 that can comprise a plurality of input samples associated with a plurality of labels. As a result of receiving the input data 202 the one or more machine-learned models 200 can generate output data 214 that can comprise embeddings comprising a plurality of video embeddings and/or a plurality of frame segment embeddings. In some implementations, the one or more machine-learned models 200 can include a plurality of machine-learned search models 204 that are operable to generate the plurality of embeddings that can comprise video embeddings and/or a plurality of frame segment embeddings.

Figure 3:
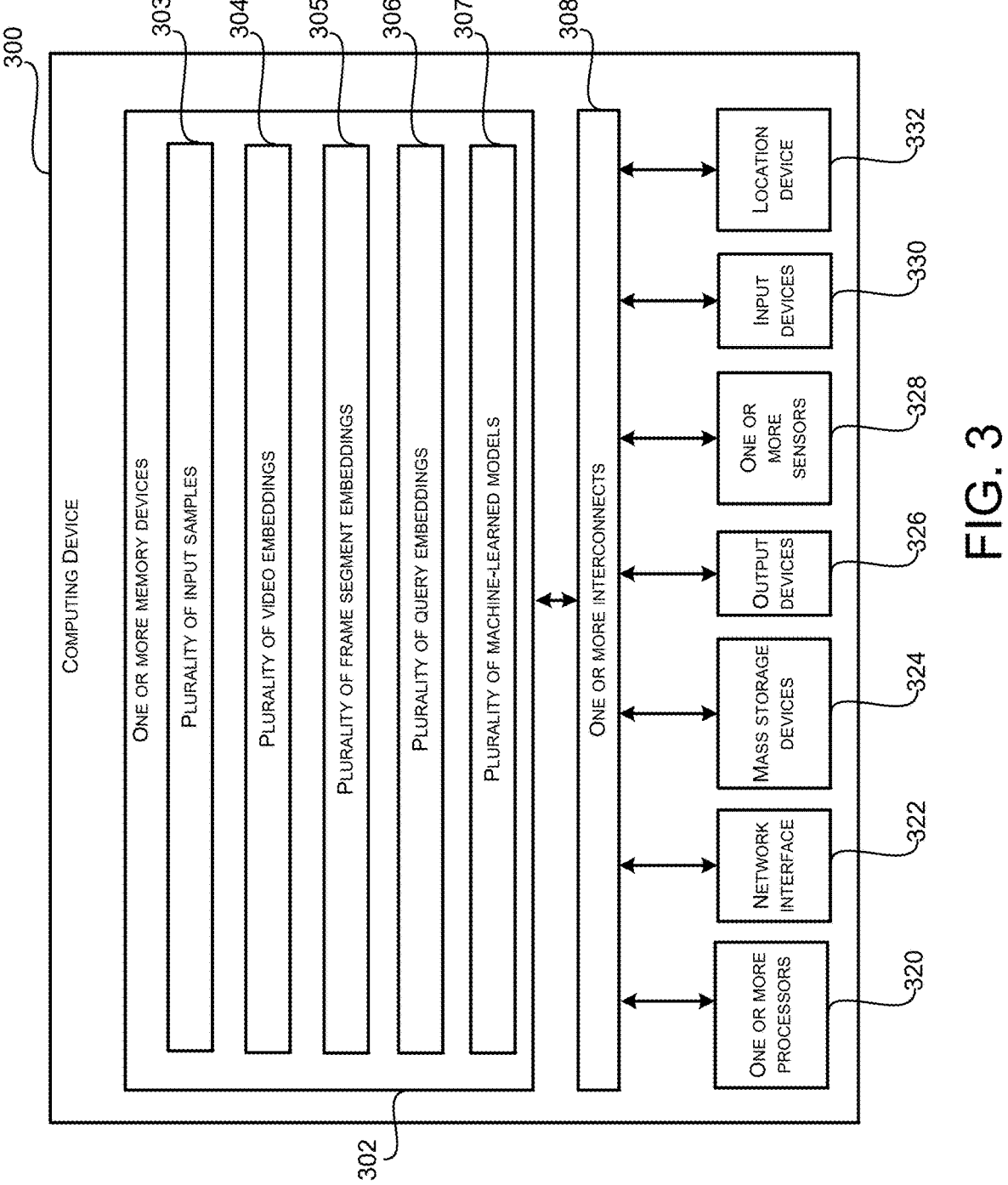
FIG. 3 depicts an example of a computing device according to example embodiments of the present disclosure.

FIG. 3 depicts an example of a computing device according to example embodiments of the present disclosure. A computing device 300 can include one or more features and/or capabilities of the computing device 102, the server computing system 130, and/or the training computing system 150. Furthermore, the computing device 300 can perform one or more actions and/or operations performed by the computing device 102, the server computing system 130, and/or the training computing system 150, which are described with respect to FIG. 1A.

As shown in FIG. 3, the computing device 300 can include one or more memory devices 302, a plurality of input samples 303, a plurality of video embeddings 304, a plurality of frame segment embeddings 305, a plurality of query embeddings 306, a plurality of machine-learned models 307, one or more interconnects 308, one or more processors 320, a network interface 322, one or more mass storage devices 324, one or more output devices 326, one or more sensors 328, one or more input devices 330, and/or the location device 332. The computing device 300 can be configured as a desktop computing device and/or a mobile computing device (e.g., a smartphone, tablet computing device, and/or laptop computing device). Further, the computing device 300 can process and/or generate data (e.g., data comprising the plurality of video embeddings 304, the plurality of frame segment embeddings 305, and/or the plurality of query embeddings 306) based on a plurality of input samples 303 (e.g., video samples, images, text segments, and/or audio segments) which can include local data stored in the one or more memory devices 302 and/or data received from another computing device or computing system (e.g., a remote computing system).

The one or more memory devices 302 can store information and/or data (e.g., the plurality of input samples 303, the plurality of video embeddings 304, the plurality of frame segment embeddings 305, the plurality of query embeddings 306, and/or the plurality of machine-learned models 307). Further, the one or more memory devices 302 can include one or more computer-readable mediums (e.g., tangible non-transitory computer-readable media), including RAM, ROM, EEPROM, EPROM, flash memory devices, magnetic disks, and combinations thereof. The information and/or data stored by the one or more memory devices 302 can be executed by the one or more processors 320 to cause the computing device 300 to perform operations including operations associated with receiving a search query, generating a search query embedding, determine a plurality of video relevance scores, determining a plurality of relevant video embeddings, determining a plurality of frame segment relevance scores, and/or determining a plurality of relevant frame segment embeddings.

The plurality of input samples 303 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154, respectively. In some embodiments, the plurality of input samples 303 can be received from one or more computing systems (e.g., the server computing system 130 that is depicted in FIG. 1A) which can include one or more computing systems that are remote (e.g., in another city, another building, and/or another room) from the computing device 300.

The plurality of video embeddings 304 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154, respectively. Furthermore, the plurality of video embeddings 304 can include information associated with the plurality of input samples 303 (e.g., embeddings based on video samples and/or images). In some embodiments, the plurality of video embeddings 304 can be received from one or more computing systems (e.g., the server computing system 130 that is depicted in FIG. 1A) which can include one or more computing systems that are remote from the computing device 300.

The plurality of frame segment embeddings 305 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154, respectively. Furthermore, the plurality of frame segment embeddings 305 can include information associated with the plurality of input samples 303 (e.g., embeddings based on video samples and/or frame samples). In some embodiments, the plurality of frame segment embeddings 305 can be received from one or more computing systems (e.g., the server computing system 130 that is depicted in FIG. 1A) which can include one or more computing systems that are remote from the computing device 300.

The plurality of query embeddings 306 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154, respectively. Furthermore, the plurality of query embeddings 306 can include information associated with the plurality of video embeddings 304 and/or the plurality of frame segment embeddings 305. In some embodiments, the plurality of query embeddings 306 can be received from one or more computing systems (e.g., the server computing system 130 that is depicted in FIG. 1A) which can include one or more computing systems that are remote from the computing device 300.

The plurality of machine-learned models 307 (e.g., the one or more machine-learned models 120, the one or more machine-learned models 140, and/or the machine-learned models 200) can include one or more portions of the data 116, the data 136, and/or the data 156 which are depicted in FIG. 1A and/or instructions (e.g., the instructions 118, the instructions 138, and/or the instructions 158 which are depicted in FIG. 1A) that are stored in the memory 114, the memory 134, and/or the memory 154, respectively. Furthermore, the plurality of machine-learned models 307 can be configured to receive the plurality of input samples 303 and generate the plurality of video embeddings 304, the plurality of frame segment embeddings 305, and/or the plurality of query embeddings 306. In some embodiments, the plurality of machine-learned models 307 can be received from one or more computing systems (e.g., the server computing system 130 that is depicted in FIG. 1A) which can include one or more computing systems that are remote from the computing device 300.

The one or more interconnects 308 can include one or more interconnects or buses that can be used to send and/or receive one or more signals (e.g., electronic signals) and/or data (e.g., the plurality of input samples 303, the plurality of video embeddings 304, and/or the plurality of machine-learned models 307) between devices of the computing device 300, including the one or more memory devices 302, the one or more processors 320, the network interface 322, the one or more mass storage devices 324, the one or more output devices 326, the one or more sensors 328, and/or the one or more input devices 330. The one or more interconnects 308 can be arranged or configured in different ways, including as parallel or serial connections. Further the one or more interconnects 308 can include one or more internal buses to connect the internal components of the computing device 300; and one or more external buses used to connect the internal components of the computing device 300 to one or more external devices. By way of example, the one or more interconnects 308 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (Fire Wire), and/or other interfaces that can be used to connect components.

The one or more processors 320 can include one or more computer processors that are configured to execute the one or more instructions stored in the one or more memory devices 302. For example, the one or more processors 320 can, for example, include one or more general purpose central processing units (CPUs), application specific integrated circuits (ASICs), neural processing units (NPUs), and/or one or more graphics processing units (GPUs). Further, the one or more processors 320 can perform one or more actions and/or operations including one or more actions and/or operations associated with the plurality of input samples 303, the plurality of video embeddings 304, the plurality of frame segment embeddings 305, the plurality of query embeddings 306, and/or the plurality of machine-learned models 307. The one or more processors 320 can include single or multiple core devices including a microprocessor, microcontroller, integrated circuit, and/or a logic device.

The network interface 322 can support network communications. For example, the network interface 322 can support communication via networks including a local area network and/or a wide area network (e.g., the Internet). Further, the network interface 322 can be used to receive data (e.g., the plurality of input samples 303, the plurality of video embeddings 304, the plurality of frame segment embeddings 305, the plurality of query embeddings 306, and/or the plurality of machine-learned models 307) from other computing devices. The one or more mass storage devices 324 (e.g., a hard disk drive and/or a solid-state drive) can be used to store data including the plurality of input samples 303, the plurality of video embeddings 304, the plurality of frame segment embeddings 305, the plurality of query embeddings 306, and/or the plurality of machine-learned models 307.

The one or more output devices 326 can include one or more display devices (e.g., LCD display, OLED display, Mini-LED display, microLED display, plasma display, and/or CRT display), one or more light sources (e.g., LEDs), one or more audio output devices (e.g., one or more loudspeakers), and/or one or more haptic output devices (e.g., one or more devices that are configured to generate vibratory output). For example, the one or more output devices 326 can comprise a touch sensitive display that is used to output an interface (e.g., a user interface) that can be configured to display indications based on images associated with the plurality of input samples 303, the plurality of video embeddings 304, the plurality of frame segment embeddings 305, the plurality of query embeddings 306, and/or the plurality of machine-learned models 307.

The one or more sensors 328 can comprise one or more LiDAR devices, one or more sonar devices, one or more radar devices, one or more accelerometers, one or more gyroscopes, one or more altimeters, and/or one or more temperature sensors (e.g., one or more thermometers). The one or more input devices 330 can include one or more keyboards, one or more touch sensitive devices (e.g., a touch screen display), one or more buttons (e.g., a power button and/or volume buttons), one or more microphones, and/or one or more imaging devices (e.g., one or more cameras).

The one or more memory devices 302 and the one or more mass storage devices 324 are illustrated separately, however, the one or more memory devices 302 and the one or more mass storage devices 324 can be regions within the same memory module. The computing device 300 can include one or more additional processors, memory devices, network interfaces, which may be provided separately or on the same chip or board. The one or more memory devices 302 and the one or more mass storage devices 324 can include one or more computer-readable media, including, but not limited to, non-transitory computer-readable media, RAM, ROM, hard drives, flash drives, and/or other memory devices.

The one or more memory devices 302 can store sets of instructions for applications including an operating system that can be associated with various software applications or data. For example, the one or more memory devices 302 can store sets of instructions for applications that can generate output including the plurality of input samples 303, the plurality of video embeddings 304, the plurality of frame segment embeddings 305, the plurality of query embeddings 306, and/or the plurality of machine-learned models 307. The one or more memory devices 302 can be used to operate various applications including a mobile operating system developed specifically for mobile devices. As such, the one or more memory devices 302 can store instructions that allow the software applications to access data including data associated with the plurality of input samples 303, the plurality of video embeddings 304, the plurality of frame segment embeddings 305, the plurality of query embeddings 306, and/or the plurality of machine-learned models 307. In other embodiments, the one or more memory devices 302 can be used to operate or execute a general-purpose operating system that operates on both mobile and stationary devices, including for example, smartphones, laptop computing devices, tablet computing devices, and/or desktop computers.

The software applications that can be operated or executed by the computing device 300 can include applications associated with the system 100 shown in FIG. 1A. Further, the software applications that can be operated and/or executed by the computing device 300 can include native applications and/or web-based applications.

The location device 332 can include one or more devices or circuitry for determining the position of the computing device 300. For example, the location device 332 can determine an actual and/or relative position of the computing device 300 by using a satellite navigation positioning system (e.g., a GPS system, a Galileo positioning system, the GLObal Navigation satellite system (GLONASS), and/or the BeiDou Satellite Navigation and Positioning system), an inertial navigation system, a dead reckoning system, based on IP address, by using triangulation and/or proximity to cellular towers and/or Wi-Fi hotspots.

Figure 4:
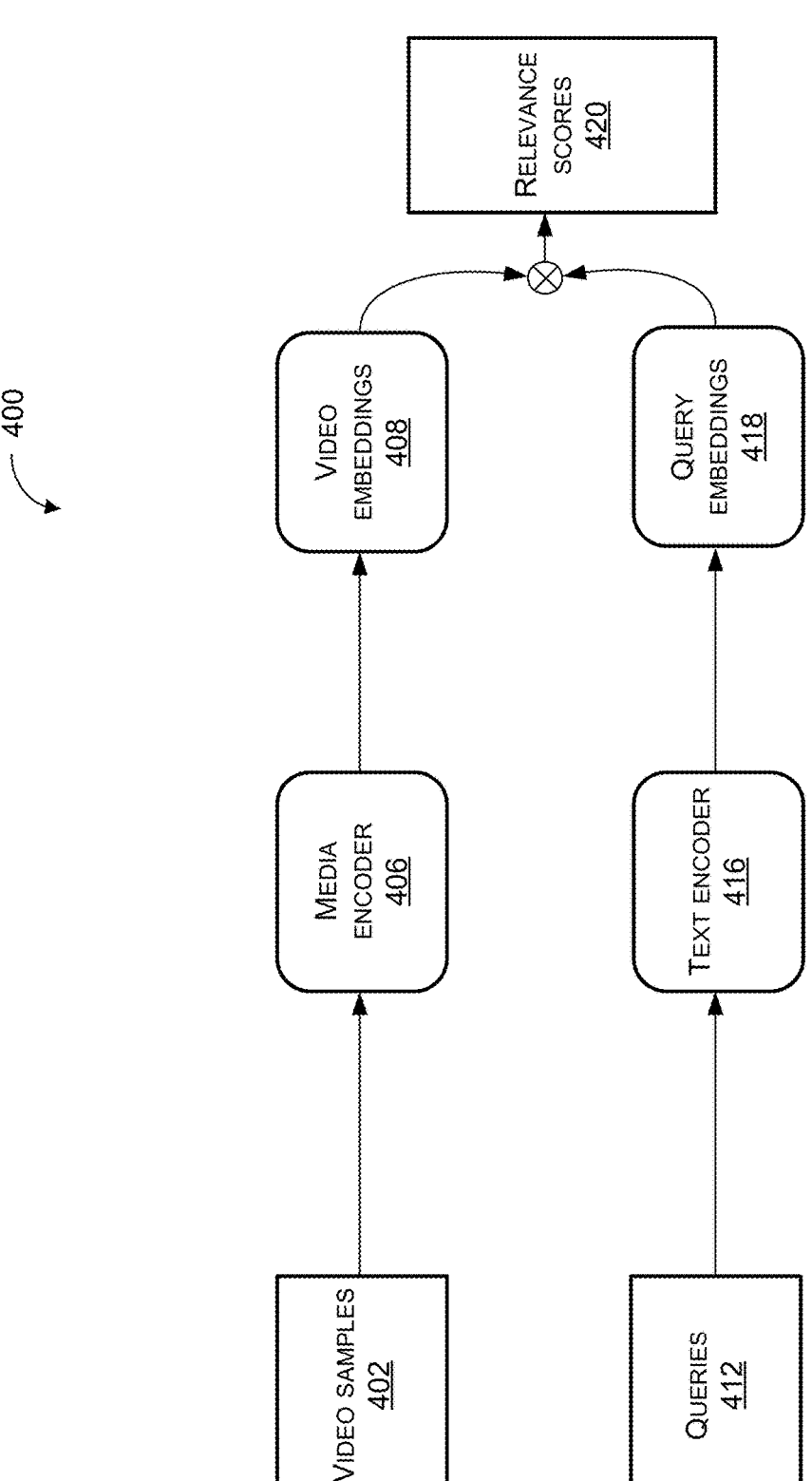
FIG. 4 depicts an example of a dual encoder model that is configured to generate embeddings based on input samples according to example embodiments of the present disclosure.

FIG. 4 depicts an example of a dual encoder model that is configured to generate embeddings based on input samples according to example embodiments of the present disclosure. A computing system 400 can include one or more features and/or capabilities of the computing device 102, the server computing system 130, the training computing system 150, and/or the computing device 300. Furthermore, the computing system 400 can perform one or more actions and/or operations that can be performed by the computing device 102, the server computing system 130, the training computing system 150, and/or the computing device 300.

The computing system 400 comprises a plurality of video samples 402, a media encoder 406, a plurality of video embeddings 408, query samples 412, a text encoder 416, a plurality of query embeddings 418, and a plurality of relevance scores 420.

In FIG. 4, a plurality of input samples can comprise the plurality of video samples 402 associated with a plurality of video sample labels and a plurality of query samples 412 associated with a plurality of query sample labels. For example, the plurality of video samples can comprise videos of various sporting events and the plurality of query sample labels can indicate information about the plurality of sporting events including the type of sport, the sporting event, players in the sporting events, and/or a transcript indicating speech and/or descriptive text at times and/or frames of the videos.

The plurality of video samples can be processed by a plurality of machine-learned models comprising the media encoder 406. The media encoder 406 can comprise a machine-learned model that is configured and/or trained to receive the plurality of video samples 402 and generate the plurality of video embeddings 408 based on the plurality of video samples 402. Further, the text encoder 416 can comprise a machine-learned model that is configured and/or trained to receive the plurality of query samples 412 and generate the plurality of query embeddings 418 based on the plurality of query samples 412.

In this example, the plurality of relevance scores 420 can be generated based on a comparison of a video embedding of the plurality of video embeddings 408 to a query embedding of the plurality of query embeddings 418. The plurality of relevance scores 420 can indicate the relevance of a video sample of the plurality of video samples 402 with respect to a query sample of the plurality of query samples 412. In some embodiments, the plurality of relevance scores 420 can be based on a cosine similarity (e.g., a cosine similarity based on a dot product of a video embedding and a query embedding) of a video embedding of the plurality of video embeddings 408 with respect to a query embedding of the plurality of query embeddings 418. In some embodiments, the relevance score 420 can be based on a Euclidean distance between a video embedding of the plurality of video embeddings 408 and a query embedding of the plurality of query embeddings 418.

For example, a query embedding of the plurality of query embeddings 418 can be based on a query of the plurality of query samples 412 that is associated with a recipe for strawberry rhubarb pie. The query embedding associated with the recipe for strawberry rhubarb pie can be compared to a video embedding that is associated with a video of birds eating birdseed, which is not relevant and not similar to the query associated with the query embedding (e.g., a recipe for strawberry rhubarb pic) and can result in a relevance score that is low. The relevance score for a video embedding that is not relevant or similar to a particular query embedding can be lower than a relevance score for another video embedding that is more relevant or similar to the same query embedding. For example, if the video embedding of the plurality of video embeddings 408 was associated with video samples of chefs preparing various cakes and pies instead of a video sample associated with birds, the relevance score would be higher due to video sample of chefs preparing cakes and pies being more relevant to a strawberry rhubarb pie recipe than images of birds.

Figure 5:
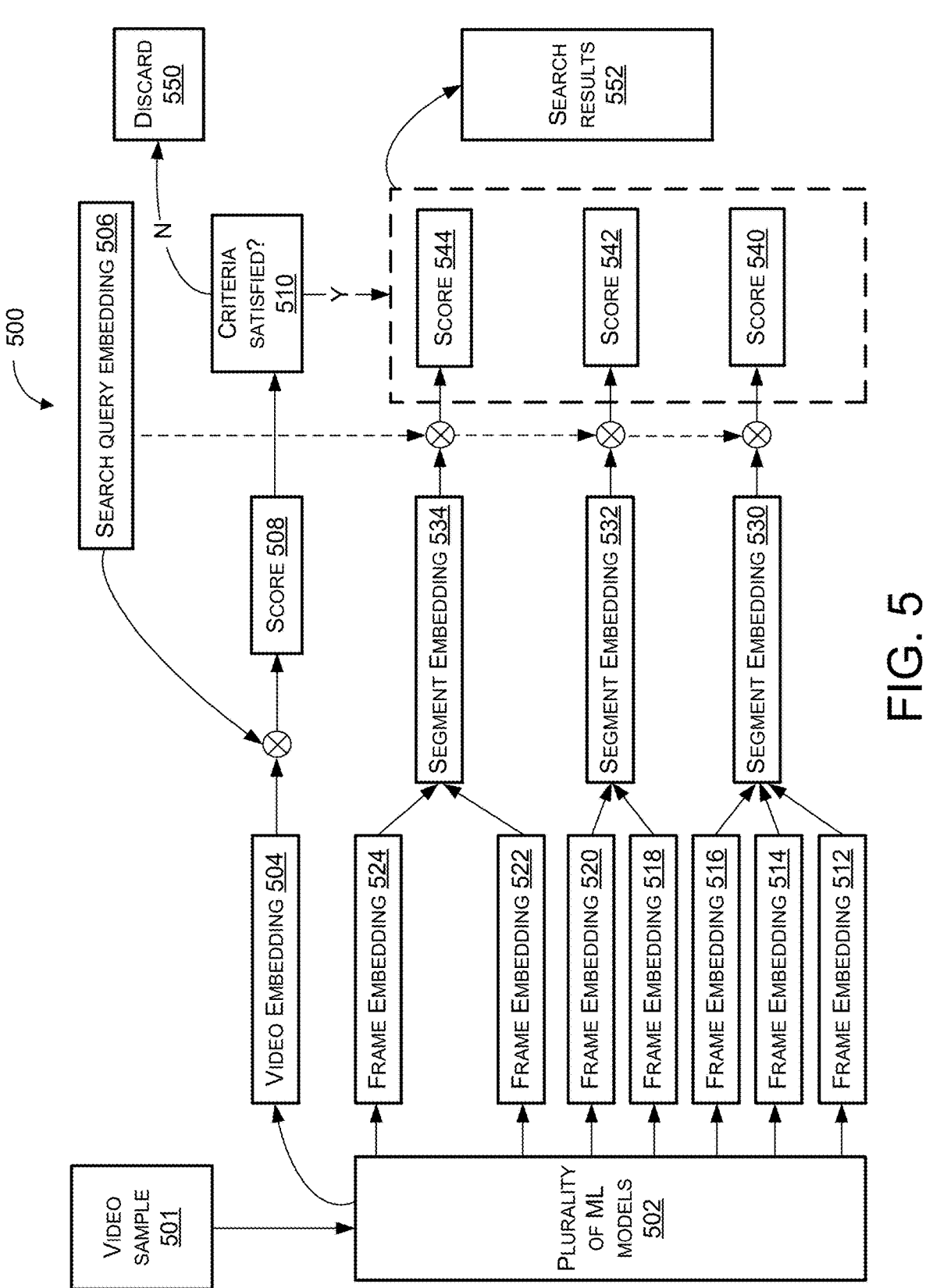
FIG. 5 depicts an example of generating embeddings to retrieve video samples, retrieve frame segment samples, and generate thumbnails according to example embodiments of the present disclosure.

FIG. 5 depicts an example of generating embeddings to retrieve video samples, retrieve frame segment samples, and generate thumbnails according to example embodiments of the present disclosure. A computing system 500 can include one or more features and/or capabilities of the computing device 102, the server computing system 130, the training computing system 150, and/or the computing device 300. Furthermore, the computing system 500 can perform one or more actions and/or operations that can be performed by the computing device 102, the server computing system 130, the training computing system 150, and/or the computing device 300.

The computing system 500 comprises a plurality of video samples 501, a plurality of machine-learned models 502, a video embedding 504, a search query embedding 506, a video relevance score 508, relevance criteria operation 510, frame embeddings 512-524, frame segment embeddings 530-534, frame segment relevance scores 540-544, a discard video embedding operation 550, and/or search results 552.

In FIG. 5, a plurality of input samples can comprise the plurality of video samples 501 that can be associated with a plurality of video sample labels. Further, a search query embedding 506 can be based on a search query (e.g., a search query entered into a search application). The plurality of input samples and/or the search query can be processed by the plurality of machine-learned models 502 which are configured and/or trained to generate the video embedding 504, the video relevance score 508, the search query embedding 506, the frame embeddings 512-524, the frame segment embeddings 530-534, and/or the frame segment relevance scores 540-544.

In this example, the plurality of machine-learned models 502 can generate a video embedding that is based on the video sample 501. For example, the video sample 501 can comprise video of a cat playing with a ball, drinking water from a bowl after playing with the ball, and then falling asleep after drinking the water. Further, the plurality of machine-learned models 502 can generate the search query embedding 506 that is based on a search query searching for video samples of sleeping cats.

The video embedding 504 can be compared to the search query embedding 506 to determine how relevant and/or similar the video embedding 504 is to the search query embedding 506. For example, cosine similarity operations can be performed on the video embedding 504 and the search query embedding 506 to determine the extent to which the video embedding 504 is relevant and/or similar to the search query embedding 506. Based on the comparison of the video embedding 504 to the search query embedding 506 the video relevance score 508 can be generated.

In some embodiments, the video relevance score 508 can be based on a Euclidean distance between the video embedding 504 and the search query embedding 506. In this example, the relevance of the video sample 501 with respect to the search query embedding 506 is high, since the video sample comprises frames in which a cat is sleeping. Based on the video relevance score 508 being high, the relevance criteria operation 510 can determine that the video relevance score 508 satisfies one or more relevance criteria by exceeding a relevance threshold. If the video relevance score 508 did not satisfy the one or more relevance criteria, the video sample 501 could be discarded and the search query embedding 506 could be compared to another video embedding based on another video sample (e.g., a different video sample). Based on the relevance criteria operation 510 determining that the one or more relevance criteria are satisfied, the plurality of machine-learning models can generate the plurality of frame embeddings 512-524 based on input comprising the video sample 501 or the video embedding 504. In some embodiments, the plurality of frame embeddings 512-524 can be generated (e.g., generated by the plurality of machine-learned models 502 based on input comprising the video sample 501) without determining whether the one or more relevance criteria are satisfied.

Further, the computing system 500 can process the plurality of frames 512-524 to determine adjacent frames that are similar. The adjacent frames that are similar can be clustered into the frame segment embeddings 530-534. In this example, the frame segment embedding 530 is based on clustering the plurality of frame embeddings 512-516, the frame segment embedding 532 is based on clustering the plurality of frame embeddings 518 and 520, and the frame segment embedding 534 is based on clustering the plurality of frame embeddings 522 and 524. For example, the plurality of frame segment embeddings 530 can comprise similar frames in which the cat is playing with a ball, the plurality of frame segment embeddings 532 can comprise similar frames in which the cat is drinking water from the bowl, and the plurality of frame segment embeddings can comprise similar frames of the cat sleeping.

The frame segment embeddings 530-534 can be compared to the search query embedding 506 and the frame segment relevance scores 540-544 can be generated based on the comparison. In this example, as a result of the frame segment embeddings 534 being associated with the video frames of the cat sleeping which is similar to the search query associated with the search query embedding 506, the relevance score 544 is higher than the frame segment relevance scores 540 and 542 which are less relevant to the search query embedding 506. Based on the frame segment relevance scores 540-544, the search results 552 can be generated. The search results can comprise frames of the video sample that correspond to the frame segment embedding that is the most relevant. For example, the search results can comprise a thumbnail image that includes the frames of the sleeping cat. Further, the search results can include a video sample based on the relevant frames of the cat sleeping and/or an indication of the time intervals in the video sample of the cat in which the cat is sleeping.

Figure 6:
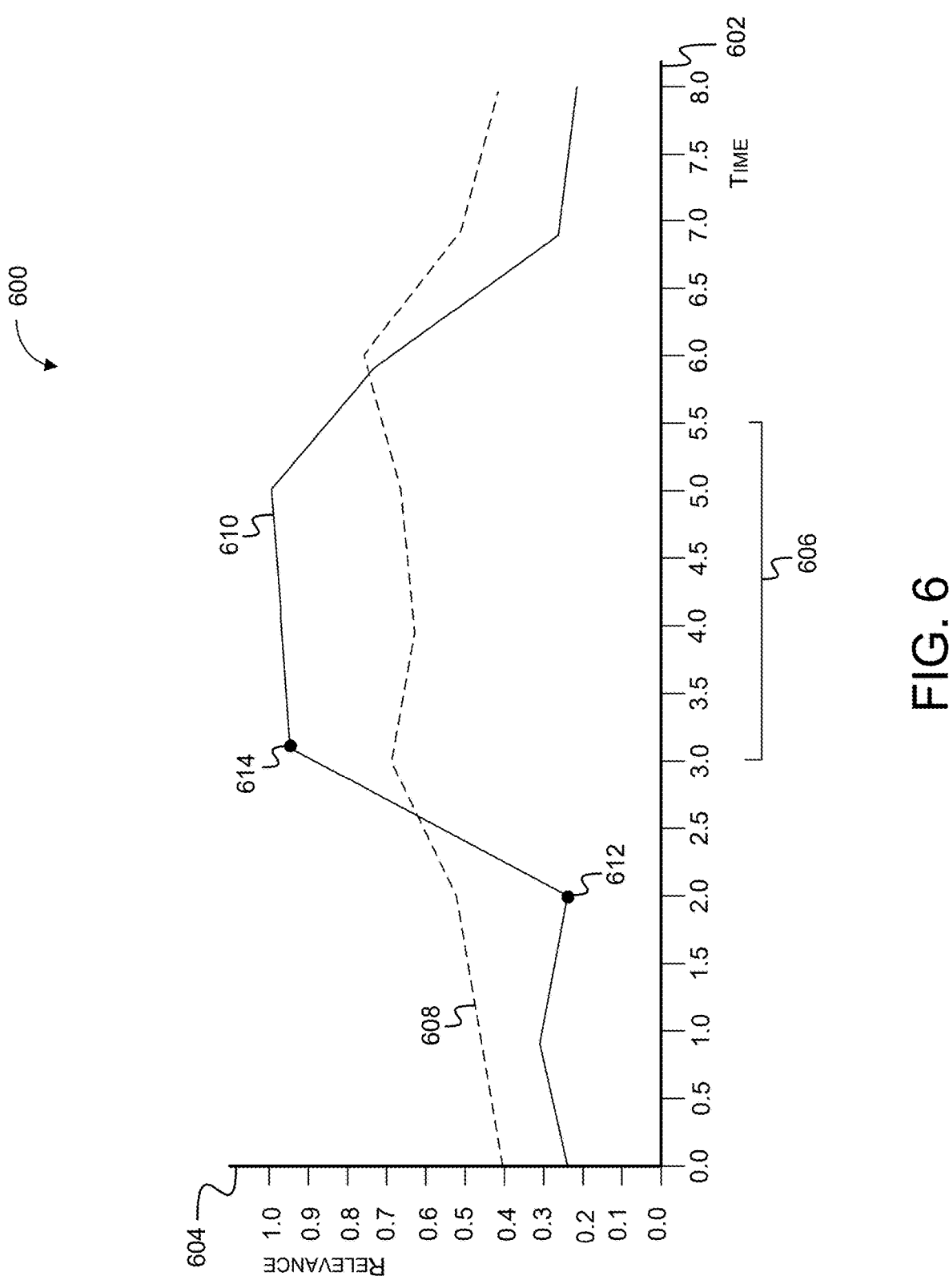
FIG. 6 depicts an example of processing relevant frame segments according to example embodiments of the present disclosure.

FIG. 6 depicts an example of processing relevant frame segments according to example embodiments of the present disclosure. The data and operations described with respect to the diagram 600 can be performed by a computing system that can include one or more features and/or capabilities of the computing device 102, the server computing system 130, the training computing system 150, and/or the computing device 300. Furthermore, the computing system can perform one or more actions and/or operations that can be performed by the computing device 102, the server computing system 130, the training computing system 150, and/or the computing device 300.

The diagram 600 comprises a line chart in which the x-axis of the diagram 600 is a time axis 602, the y-axis of the diagram 600 is a relevance axis 604, the time interval 606 represents a time interval associated with the time axis 602 (e.g., a time in minutes), the frames 608 represent a plurality of frames of a first video sample, and the frames 610 represent a plurality of frames of a second video sample.

The relevance axis 604 can be associated with and/or indicate the relevance score of a frame from a video sample. The relevance axis 604 comprises values ranging from 0.0 to 1.0, in which 0.0 is associated with a frame segment embedding not being relevant to a search query embedding, 1.0 being associated with a frame embedding being completely relevant to a search query embedding, and intermediate values between 0.0 and 1.0 being associated with increasing relevance. In this example, the relevance of a frame embedding relative to a search query embedding at a particular point in time can be determined based on the points on the frames 608 and/or the frames 610 that correspond to the time axis 602 and the relevance axis 604. For example, the relevance of the frame 612 of the plurality of frames 610 at the time interval of approximately 2.0 minutes is approximately 0.25, which is a low relevance. Frame 614 of the plurality of frames 610 at the time interval of approximately 3.0 minutes is approximately 0.95, which is a high relevance.

In this example, a search embedding can be associated with a search query seeking instructions to prepare a spicy Korean noodle dish. The frames 608 can be associated with a video sample in which a chef provides instructions to prepare a variety of Korean rice dishes and soups but does not include spicy Korean noodle dishes. The frames 610 can be associated with a video sample in which a different chef provides instructions to prepare a variety of Korean dishes and specifically shows the preparation of a spicy Korean noodle dish in the time interval 606 that ranges from approximately three minutes to approximately five and a half minutes.

The plurality of frames 610 that are associated with the time interval 606 can be determined to exceed a relevance threshold (e.g., a threshold of greater than 0.9) and the plurality of frames 610 associated with the time interval 606 can be determined to meet relevance criteria and be provided in search results based on the search query seeking a spicy Korean noodle dish. For example, one of the relevant frames from the plurality of frames 610 associated with the time interval 606 can be used in a thumbnail image that includes the spicy Korean noodle dish.

Figure 7:
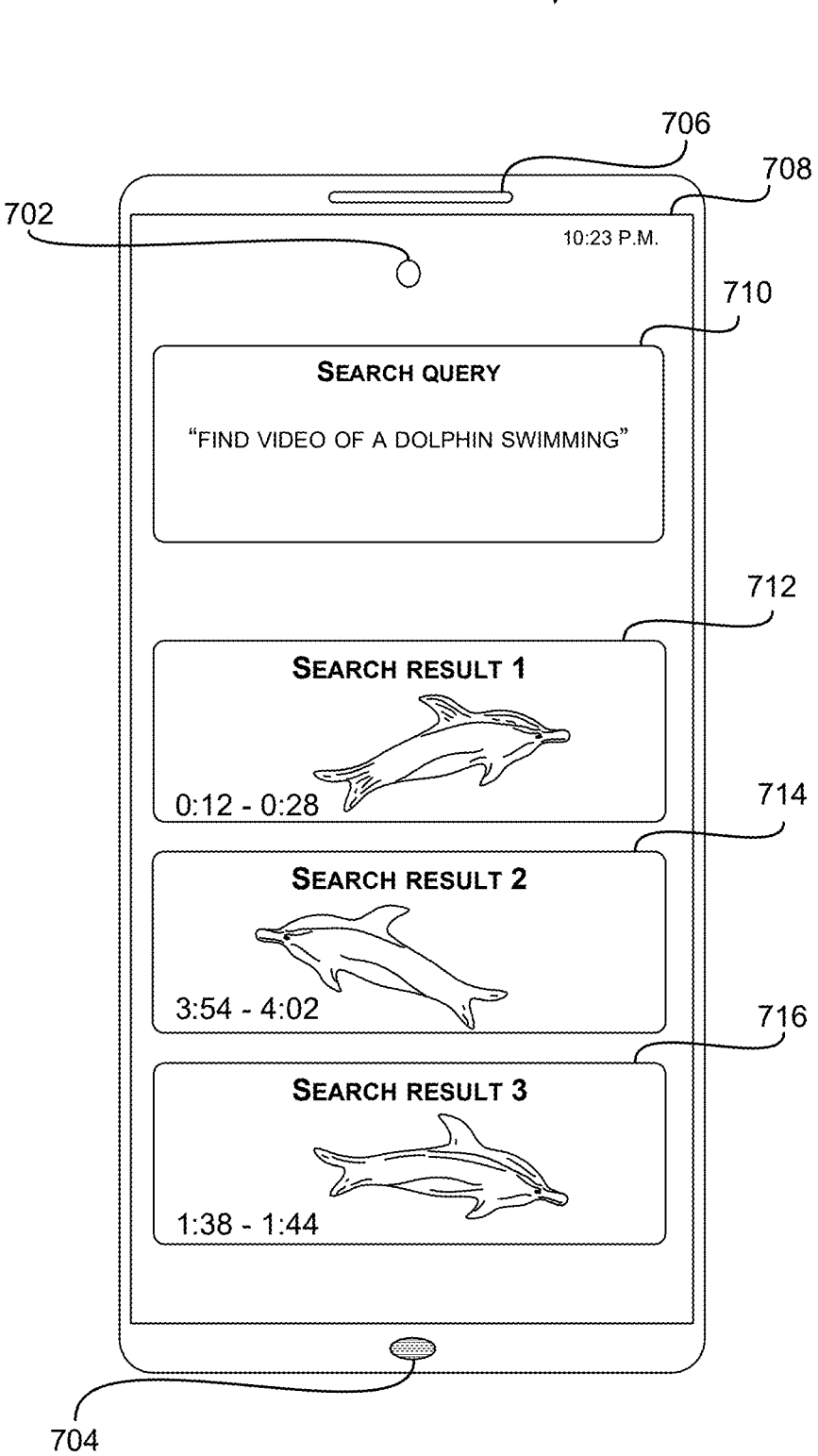
FIG. 7 depicts an example of generating search results comprising relevant video frames according to example embodiments of the present disclosure.

FIG. 7 depicts an example of generating search results comprising relevant video frames according to example embodiments of the present disclosure. A computing device 700 can include one or more features and/or capabilities of the computing device 102, the server computing system 130, the training computing system 150, the computing device 300, and/or the computing system 500.

The computing device 700 can include an imaging component 702, an audio input component 704, an audio output component 706, a display component 708, a search query 710, and search results 712-716.

The computing device 700 can be configured to perform one or more operations comprising sending, receiving, processing, and/or generating data associated with input samples, video embeddings, frame segment embeddings, and/or query embeddings. Further, the computing device 700 can be configured to receive the search query 710 and generate search results including the search results 712-716.

In this example, the computing device 700 has received the search query 710 via the display component 708, which is a touch sensitive display component. The search query 710 which indicates "FIND VIDEO OF A DOLPHIN SWIMMING" has been entered via an onscreen keyboard (not shown) that was generated by the computing device 700 and hidden from view after the search query 710 was entered. In some embodiments, the search query 710 can be inputted into the computing device 700 via the audio input component 704 (e.g., a microphone) that can be used to detect speech that can be recognized by the computing device 700.

The computing device 700 can use the search query 710 as input to a plurality of machine-learned models that can be implemented on the computing device 700 and/or that are implemented on a remote computing device that is able to send data to and/or receive data from the computing device 700. The one or more machine-learned models can be configured and/or trained to generate a search query embedding based on the search query 710, access a plurality of video embeddings, compare the search embedding to the plurality of video embeddings and/or a plurality of frame segment embeddings, determine relevant frame embeddings, and generate the search results 712-716.

In this example, the search results 712-716 comprise thumbnail images of dolphins that were retrieved based on the search query 710. The search results 712-716 can comprise still images and/or motion video. Further, the search results 712-716 can be configured to access a webpage associated with the video sample from which the search results 712-716 were retrieved. The search results 712-716 comprise indications of the time interval in the corresponding video samples on which the search results 712-716 are based. For example, the search result 712 indicates that the video frames are from a time interval that starts at the twelve second mark and ends at the twenty-eight second mark of the corresponding video sample. The search result 714 indicates that the video frames are from a time interval that starts at the three minute and fifty-four second mark and ends at the four minute and two second mark of the corresponding video sample. Further, the search result 716 indicates that the video frames are a time interval that starts at the one-minute and thirty-eight second mark and ends at the one minute and forty-four second mark of the corresponding video sample. The search results 712-716 can be sorted based on the relevance of the search results 712-716. For example, the search result 712 may be the most relevant search result and the search result 716 may be the least relevant search result. In this example, all of the search results are highly relevant to the search query 710 and the order of the search results 712-716 is the result of minor differences in their respective relevance. For example, search result 712 may be determined to be the most relevant because the video sample that includes a dolphin swimming has a longer duration than the search result 714 and 716. In some embodiments, the search results 712-716 can comprise audio that can be outputted via the audio output component 706 (e.g., a loudspeaker).

FIG. 8 depicts a flow chart diagram of an example method of video frame search and retrieval according to example embodiments of the present disclosure. One or more portions of the method 800 can be executed and/or implemented on one or more computing devices or computing systems comprising, for example, the computing device 102, the server computing system 130, the training computing system 150, and/or the computing device 300. Further, one or more portions of the method 800 can be executed or implemented as an algorithm on the hardware devices or systems disclosed herein. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include receiving a search query. For example, the computing device 102 can receive data comprising the search query (e.g., a search query associated with search for a video sample). The search query can be received from a local device (e.g., search query input via a keyboard of the computing device 102) and/or from a remote source (e.g., a remote computing system) via a network such as the network 180.

At 804, the method 800 can include generating, based on inputting the search query into a plurality of machine-learned models, a search query embedding. For example, the server computing system 130 can implement one or more machine-learned models that are configured and/or trained to generate a search query embedding based on input comprising a search query (e.g., a text based search query).

At 806, the method 800 can include determining, based on comparing the search query embedding to a plurality of video embeddings, a plurality of video relevance scores associated with the plurality of video embeddings. The plurality of video embeddings can be based on a plurality of video samples comprising a plurality of frames. Further, the plurality of video embeddings can be associated with a plurality of frame segment embeddings based on clusters of one or more similar frames of the plurality of frames. For example, the server computing system 130 can perform operations to determine the plurality of video relevance scores based on comparing the search query embedding to the plurality of video embeddings.

At 808, the method 800 can include determining a plurality of relevant video embeddings comprising the plurality of video embeddings that are associated with the plurality of video relevance scores that satisfy one or more relevance criteria. For example, the server computing system 130 can determine the plurality of relevant video embeddings comprising the plurality of video embeddings that are associated with video relevance scores that exceed a relevance threshold that indicates a sufficiently high level of relevance.

At 810, the method 800 can include determining, based on comparing the search query embedding to the plurality of frame segment embeddings associated with the plurality of relevant video embeddings, a plurality of frame segment relevance scores associated with the plurality of frame segment embeddings. For example, the server computing system 130 can perform operations to determine the plurality of frame segment relevance scores based on comparing the search query embedding to the plurality of frame segment embeddings.

At 812, the method 800 can include determining a plurality of relevant frame segment embeddings comprising the plurality of frame segment embeddings associated with the plurality of frame segment relevance scores that satisfy the one or more relevance criteria. For example, the server computing system 130 can determine the plurality of relevant frame segment embeddings comprising the plurality of frame segment embeddings that are associated with frame segment relevance scores that exceed a relevance threshold that indicates a sufficiently high level of relevance.

At 814, the method 800 can include generating one or more search results associated with one or more frames corresponding to the plurality of relevant frame segment embeddings. For example, the server computing system 130 can generate search results that comprise thumbnails that can comprise images based on the one or more frames corresponding to the plurality of relevant frame segment embeddings. Further, the search results can comprise links to the video samples associated with the one or more frames corresponding to the plurality of relevant frame segment embeddings.

At 816, the method 800 can include sorting the one or more search results based on the plurality of frame segment relevance scores associated with the plurality of frame segment embeddings that satisfy the one or more relevance criteria. For example, the server computing system 130 can sort the one or more search results from most relevant to least relevant. The more relevant search results can be displayed at the top of a list of search results and other search results can be listed from top to bottom based on their order of relevance.

FIG. 9 depicts a flow chart diagram of an example method of generating embeddings and training machine-learning models according to example embodiments of the present disclosure. One or more portions of the method 900 can be executed and/or implemented on one or more computing devices or computing systems comprising, for example, the computing device 102, the server computing system 130, the training computing system 150, and/or the computing device 300. Further, one or more portions of the method 900 can be executed or implemented as an algorithm on the hardware devices or systems disclosed herein. In some embodiments, one or more portions of the method 900 can be performed as part of the method 800 that is described with respect to FIG. 8. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include receiving a plurality of input samples comprising the plurality of video samples and a plurality of topics and/or queries associated with the plurality of video samples. The plurality of video samples can comprise the plurality of frames and can be associated with a plurality of labels. For example, the plurality of input samples can comprise a plurality of video samples associated with a plurality of labels that indicate one or more topics and/or one or more queries associated with the plurality of video samples. Further, a computing system (e.g., the server computing system 130) can receive a plurality of input samples (e.g., the training data 162) that can comprise a plurality of video samples that comprise a plurality of frames.

At 904, the method 900 can include generating, based on inputting the plurality of input samples into the plurality of machine-learned models, a plurality of video embeddings and a plurality of query embeddings. The plurality of video embeddings can be based on the plurality of video samples and can comprise a plurality of frame segment embeddings based on the plurality of frames. Further, the plurality of query embeddings can be based on the plurality of topics and/or queries. For example, the plurality of input samples can comprise a plurality of video samples comprising a plurality of frames; and a plurality of topics. The plurality of video samples can be inputted into a first machine-learned model configured and/or trained to process video samples. Further, the plurality of topics and/or queries can be inputted into a second machine-learned model configured and/or trained to process topics and/or queries. The first machine-learned model can generate a plurality of video embeddings and the second machine-learned model can generate a plurality of query embeddings. By way of further example, the server computing system 130 can implement the plurality of machine-learned models (e.g., the one or more machine-learned models 140), which can receive input comprising the plurality of input samples and generate output comprising the plurality of video embeddings.

At 906, the method 900 can include training, based on the plurality of video embeddings and the plurality of query embeddings, the plurality of machine-learned models to generate the plurality of video relevance scores associated with a relevance of the plurality of topics and/or queries with respect to the plurality of video embeddings. Training the plurality of machine-learned models can comprise modifying a plurality of parameters of the plurality of machine-learned models to minimize a loss associated with a relevance of the plurality of video embeddings with respect to a plurality of query embeddings. For example, the server computing system 130 can train the plurality of machine-learned models based on the plurality of video embeddings and/or the plurality of query embeddings. The plurality of machine-learned models can be trained over a plurality of iterations. Further, a plurality of parameters of the plurality of machine-learned models can be modified to reduce a loss (e.g., a loss that is associated with a relevance of the plurality of video embeddings with respect to the plurality of query embeddings) that is determined after each of the plurality of iterations. The plurality of machine-learned models can be trained until some threshold accuracy is achieved.

At 908, the method 900 can include training, based on the plurality of frame segment embeddings and the plurality of query embeddings, the plurality of machine-learned models to generate the plurality of frame segment relevance scores associated with a relevance of the plurality of topics and/or queries with respect to the plurality of frame segment embeddings. Training the plurality of machine-learned models can comprise modifying a plurality of parameters of the plurality of machine-learned models to minimize a loss associated with a relevance of the plurality of frame segment embeddings with respect to a plurality of query embeddings. For example, the server computing system 130 can train the plurality of machine-learned models based on the plurality of frame segment embeddings and the plurality of query embeddings. The plurality of machine-learned models can be trained over a plurality of iterations. Further, a plurality of parameters of the plurality of machine-learned models can be modified to reduce a loss (e.g., a loss that is associated with a relevance of the plurality of frame segment embeddings with respect to the plurality of query embeddings) that is determined after each of the plurality of iterations. The plurality of machine-learned models can be trained until some threshold accuracy is achieved.

Figure 10:
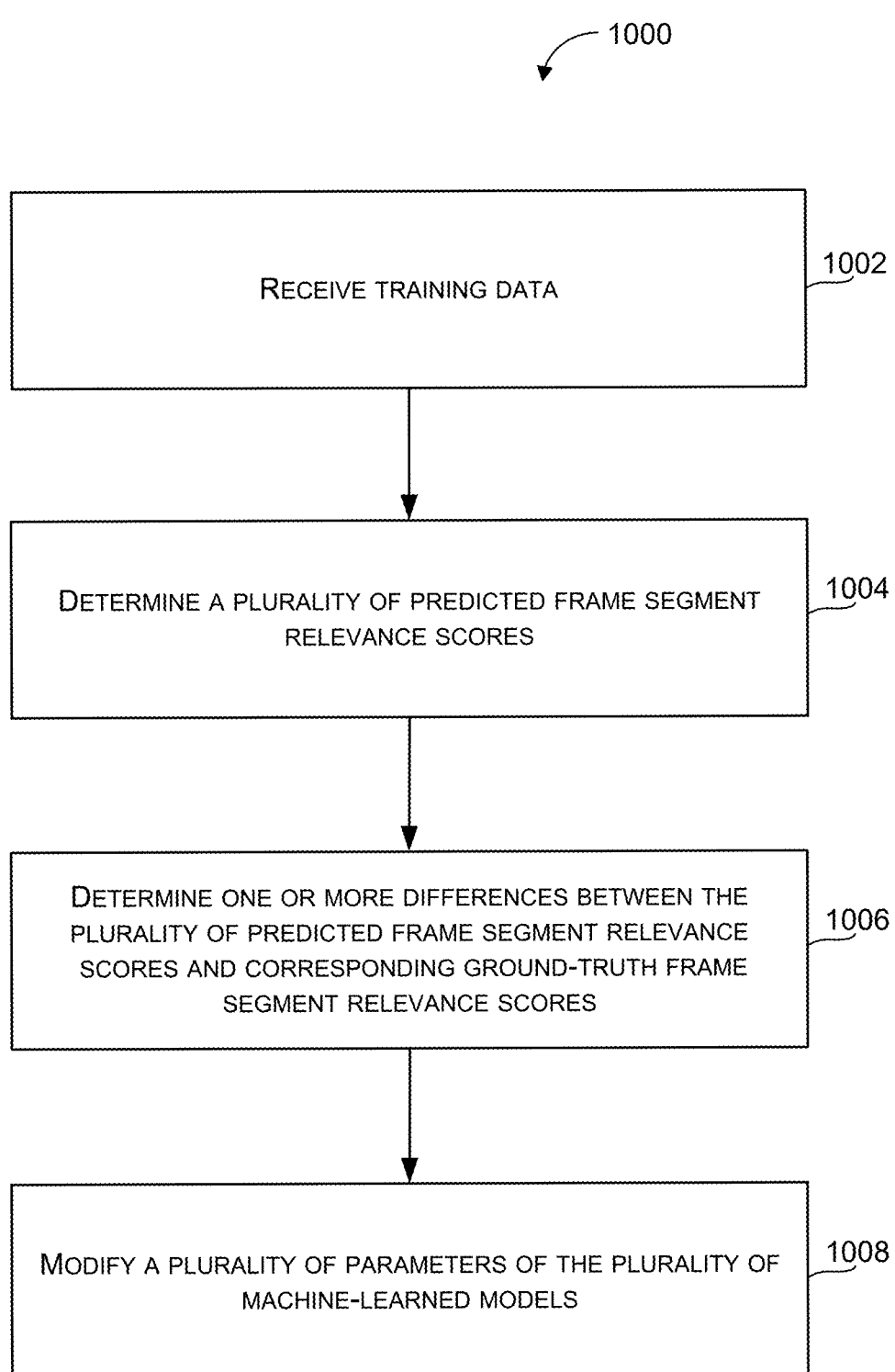
FIG. 10 depicts a flow chart diagram of an example method of training machine-learning models according to example embodiments of the present disclosure.

FIG. 10 depicts a flow chart diagram of an example method of training machine-learning models according to example embodiments of the present disclosure. One or more portions of the method 1000 can be executed and/or implemented on one or more computing devices or computing systems comprising, for example, the computing device 102, the server computing system 130, the training computing system 150, and/or the computing device 300. Further, one or more portions of the method 1000 can be executed or implemented as an algorithm on the hardware devices or systems disclosed herein. In some embodiments, one or more portions of the method 1000 can be performed as part of the method 800 that is described with respect to FIG. 8. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include receiving training data comprising the plurality of query embeddings, the plurality of frame segment embeddings, and corresponding plurality of ground-truth relevance scores associated with the relevance of the plurality of query embeddings with respect to the plurality of frame segment embeddings. For example, the server computing device 130 can receive training data comprising the plurality of query embeddings, the plurality of frame segment embeddings, and corresponding plurality of ground-truth relevance scores associated with the relevance of the plurality of query embeddings with respect to the plurality of frame segment embeddings.

At 1004, the method 1000 can include determining, based on inputting the training data comprising the plurality of query embeddings and the plurality of frame segment embeddings into the plurality of machine-learned models, a plurality of predicted relevance scores. The plurality of predicted relevance scores can be based on one or more comparisons of the plurality of query embeddings to the plurality of video embeddings. For example, the server computing system 130 can implement a plurality of machine-learned models. Based on inputting the plurality of query embeddings and the plurality of frame segment embeddings into the plurality of machine-learned models, the plurality of machine-learned models can perform one or more operations and generate a plurality of predicted relevance scores based on comparing the plurality of query embeddings to the plurality of frame segment embeddings. The plurality of predicted relevance scores can indicate a relevance and/or similarity of the plurality of query embeddings with respect to the plurality of frame segment embeddings.

At 1006, the method 1000 can include determining a loss based on one or more differences between the plurality of predicted relevance scores and the corresponding plurality of ground-truth relevance scores. For example, over a plurality of iterations, the server computing system 130 can determine a loss based on the magnitude of the difference between the plurality of predicted relevance scores and the corresponding plurality of ground-truth relevance scores. The loss can be positively correlated with the difference between the plurality of predicted relevance scores and the corresponding plurality of ground-truth relevance scores. For example, a greater difference between the plurality of predicted relevance scores and the corresponding plurality of ground-truth relevance scores can be associated with a higher loss. Further, a smaller difference between the plurality of predicted relevance scores and the corresponding plurality of ground-truth relevance scores can be associated with a smaller loss.

At 1008, the method 1000 can include modifying the plurality of parameters of the plurality of machine-learned models to minimize the loss. For example, the server computing system 130 can modify the weights of the plurality of parameters such that the weights of the plurality of parameters that contribute to reducing the loss (e.g., the parameters that increase the relevance scores) are increased and/or the weights of the plurality of parameters that contribute to increasing the loss (e.g., the parameters that decrease the relevance scores) are decreased. The plurality of weights of the plurality of parameters can be modified until some threshold loss that corresponds to a high accuracy of the plurality of relevance scores for the plurality of frame segment embeddings is achieved.

Further to the descriptions above, a user may be provided with controls allowing the user to make an election as to both if and/or when systems, programs, or features described herein may enable collection of user information (e.g., a user's images and/or a user's preferences), and if the user is sent content or communications from a server. In addition, certain data may be treated in one or more ways before it is stored or used, so that certain information of a user may be removed. For example, a user's identity may be treated so that certain other information associated with the user's identity may not be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method of video frame search and retrieval, the computer-implemented method comprising:

receiving, by a computing system comprising one or more processors, a search query;

generating, by the computing system, based on inputting the search query into at least one of a plurality of machine-learned models, a search query embedding, wherein at least one of the plurality of machine-learned models is configured to generate the search query embedding based on features of the search query;

determining, by the computing system, based on comparing the search query embedding to a plurality of video embeddings, a plurality of video relevance scores associated with the plurality of video embeddings, wherein the plurality of video embeddings are based on a plurality of video samples comprising a plurality of frames, and wherein the plurality of video embeddings are associated with a plurality of frame segment embeddings based on clusters of one or more similar frames of the plurality of frames;

determining, by the computing system, a plurality of relevant video embeddings comprising the plurality of video embeddings associated with the plurality of video relevance scores that satisfy one or more relevance criteria;

determining, by the computing system, based on comparing the search query embedding to the plurality of frame segment embeddings associated with the plurality of relevant video embeddings, a plurality of frame segment relevance scores associated with the plurality of frame segment embeddings;

determining, by the computing system, a plurality of relevant frame segment embeddings comprising the plurality of frame segment embeddings associated with the plurality of frame segment relevance scores that satisfy the one or more relevance criteria; and generating, by the computing system, one or more search results associated with one or more frames corresponding to the plurality of relevant frame segment embeddings.

2. The computer-implemented method of claim 1, further comprising:

receiving, by the computing system, a plurality of input samples comprising the plurality of video samples and a plurality of topics associated with the plurality of video samples, wherein the plurality of video samples comprise the plurality of frames and are associated with a plurality of labels;

generating, by the computing system, based on inputting the plurality of input samples into the plurality of machine-learned models, a plurality of video embeddings and a plurality of query embeddings, wherein the plurality of video embeddings are based on the plurality of video samples and comprise a plurality of frame segment embeddings based on the plurality of frames, and wherein the plurality of query embeddings are based on the plurality of topics;

training, by the computing system, based on the plurality of video embeddings and the plurality of query embeddings, the plurality of machine-learned models to generate the plurality of video relevance scores associated with a relevance of the plurality of topics with respect to the plurality of video embeddings; and training, by the computing system, based on the plurality of frame segment embeddings and the plurality of query embeddings, the plurality of machine-learned models to generate the plurality of frame segment relevance scores associated with a relevance of the plurality of topics with respect to the plurality of frame segment embeddings.

3. The computer-implemented method of claim 2, wherein the training of the plurality of machine-learned models comprises:

receiving, by the computing system, training data comprising the plurality of query embeddings, the plurality of frame segment embeddings, and a corresponding plurality of ground-truth frame segment relevance scores associated with the relevance of the plurality of query embeddings with respect to the plurality of frame segment embeddings;

determining, by the computing system, based on inputting the training data comprising the plurality of query embeddings and the plurality of frame segment embeddings into the plurality of machine-learned models, a plurality of predicted frame segment relevance scores;

determining, by the computing system, a loss based on one or more differences between the plurality of predicted frame segment relevance scores and the corresponding plurality of ground-truth frame segment relevance scores; and modifying, by the computing system, a plurality of parameters of the plurality of machine-learned models to minimize the loss.

4. The computer-implemented method of claim 2, wherein the plurality of machine-learned models are configured to generate clusters of the plurality of frames based on a similarity between two or more frames of the plurality of frames.

5. The computer-implemented method of claim 2, wherein the plurality of input samples comprise a plurality of image samples, and wherein the plurality of labels comprise labels associated with the plurality of image samples.

6. The computer-implemented method of claim 2, wherein the plurality of machine-learned models comprise a video encoder that is configured to generate the plurality of video embeddings or the plurality of frame segment embeddings based on detecting, recognizing, or classifying visual features of the plurality of input samples.

7. The computer-implemented method of claim 1, wherein the plurality of video relevance scores are associated with a relevance of the plurality of video embeddings with respect to the search query embedding, and wherein the plurality of frame segment relevance scores are associated with a relevance of the plurality of frame segment embeddings with respect to the search query embedding.

8. The computer-implemented method of claim 1, further comprising: sorting, by the computing system, the one or more search results based on the plurality of frame segment relevance scores associated with the plurality of frame segment embeddings that satisfy the one or more relevance criteria.

9. The computer-implemented method of claim 1, wherein the one or more search results comprise one or more thumbnail images based on the one or more frames corresponding to the plurality of relevant frame segment embeddings.

10. The computer-implemented method of claim 1, wherein the plurality of video relevance scores are based on a cosine similarity between the search query embedding and the plurality of video embeddings, and wherein the plurality of frame segment relevance scores are based on a cosine similarity between the search query embedding and the plurality of frame segment embeddings.

11. The computer-implemented method of claim 1, wherein the plurality of video embeddings are stored in a lookup table.

12. The computer-implemented method of claim 1, wherein the one or more relevance criteria comprise one or more video relevance criteria or one or more frame relevance criteria, wherein the one or more video relevance criteria are associated with a relevance of the plurality of video embeddings, and wherein the one or more frame relevance criteria are associated with a relevance of the plurality of frame segment embeddings, and wherein the satisfying the one or more relevance criteria comprises the plurality of video relevance scores or the plurality of frame segment relevance scores exceeding a relevance threshold.

13. The computer-implemented method of claim 1, wherein the plurality of machine-learned models comprise one or more transformer models.

14. The computer-implemented method of claim 1, wherein the one or more search results comprise one or more indications associated with a plurality of time intervals of the one or more frames corresponding to the plurality of relevant frame segment embeddings.

15. One or more tangible non-transitory computer-readable media storing computer-readable instructions that when executed by one or more processors cause the one or more processors to perform operations, the operations comprising:

receiving a search query;

generating, based on inputting the search query into at least one of a plurality of machine-learned models, a search query embedding, wherein at least one of the plurality of machine-learned models is configured to generate the search query embedding based on features of the search query;

determining, based on comparing the search query embedding to a plurality of video embeddings, a plurality of video relevance scores associated with the plurality of video embeddings, wherein the plurality of video embeddings are based on a plurality of video samples comprising a plurality of frames, and wherein the plurality of video embeddings are associated with a plurality of frame segment embeddings based on clusters of one or more similar frames of the plurality of frames;

determining a plurality of relevant video embeddings comprising the plurality of video embeddings associated with the plurality of video relevance scores that satisfy one or more relevance criteria;

determining, based on comparing the search query embedding to the plurality of frame segment embeddings associated with the plurality of relevant video embeddings, a plurality of frame segment relevance scores associated with the plurality of frame segment embeddings;

determining a plurality of relevant frame segment embeddings comprising the plurality of frame segment embeddings associated with the plurality of frame segment relevance scores that satisfy the one or more relevance criteria; and generating one or more search results associated with one or more frames corresponding to the plurality of relevant frame segment embeddings.

16. The one or more tangible non-transitory computer-readable media of claim 15, wherein the plurality of video relevance scores or the plurality of frame segment relevance scores are based on a cosine similarity between the search query embedding and the plurality of video embeddings.

17. The one or more tangible non-transitory computer-readable media of claim 15, wherein the one or more search results comprise one or more thumbnail images based on the one or more frames corresponding to the plurality of relevant frame segment embeddings.

18. A computing system comprising:

one or more processors;

one or more non-transitory computer-readable media storing instructions that when executed by the one or more processors cause the one or more processors to perform operations comprising:

receiving a search query;

generating, based on inputting the search query into at least one of a plurality of machine-learned models, a search query embedding, wherein at least one of the plurality of machine-learned models is configured to generate the search query embedding based on features of the search query;

determining, based on comparing the search query embedding to a plurality of video embeddings, a plurality of video relevance scores associated with the plurality of video embeddings, wherein the plurality of video embeddings are based on a plurality of video samples comprising a plurality of frames, and wherein the plurality of video embeddings are associated with a plurality of frame segment embeddings based on clusters of one or more similar frames of the plurality of frames;

determining a plurality of relevant video embeddings comprising the plurality of video embeddings associated with the plurality of video relevance scores that satisfy one or more relevance criteria;

determining, based on comparing the search query embedding to the plurality of frame segment embeddings associated with the plurality of relevant video embeddings, a plurality of frame segment relevance scores associated with the plurality of frame segment embeddings;

determining a plurality of relevant frame segment embeddings comprising the plurality of frame segment embeddings associated with the plurality of frame segment relevance scores that satisfy the one or more relevance criteria; and generating one or more search results associated with one or more frames corresponding to the plurality of relevant frame segment embeddings.

19. The computing system of claim 18, wherein the plurality of video relevance scores or the plurality of frame segment relevance scores are based on a cosine similarity between the search query embedding and the plurality of video embeddings.

20. The computing system of claim 18, wherein the one or more search results comprise one or more thumbnail images based on the one or more frames corresponding to the plurality of relevant frame segment embeddings.

* * * * *